(12) United States Patent
Khamashta et al.

(10) Patent No.: US 12,545,133 B2
(45) Date of Patent: Feb. 10, 2026

(54) ELECTRIC VEHICLE CHARGING SYSTEM WITH A CHARGING PROTOCOL CONTROLLER INCLUDED IN ATTACHED CABLE CIRCUITRY

(71) Applicant: ChargePoint, Inc., Campbell, CA (US)

(72) Inventors: Robert Mitri Khamashta, Campbell, CA (US); Carl Fredrick Hagenmaier, Jr., Los Altos, CA (US); Charles Hardin, San Jose, CA (US); Joseph Howard, Orlando, FL (US); Craig Toshiro Matsuno, San Jose, CA (US); Stephen Eric Sidle, Morgan Hill, CA (US)

(73) Assignee: CHARGEPOINT, INC., Campbell, CA (US)

( * ) Notice: Subject to any disclaimer, the term of this patent is extended or adjusted under 35 U.S.C. 154(b) by 0 days.

(21) Appl. No.: 18/674,388

(22) Filed: May 24, 2024

(65) Prior Publication Data
US 2024/0308363 A1 Sep. 19, 2024

Related U.S. Application Data

(62) Division of application No. 17/230,809, filed on Apr. 14, 2021, now abandoned.

(51) Int. Cl.
*B60L 53/18* (2019.01)
*B60L 53/30* (2019.01)
(Continued)

(52) U.S. Cl.
CPC ............. *B60L 53/18* (2019.02); *B60L 53/305* (2019.02); *B60L 53/62* (2019.02); *B60L 53/66* (2019.02)

(58) Field of Classification Search
CPC ........ B60L 53/18; B60L 53/305; B60L 53/62; B60L 53/66
See application file for complete search history.

(56) References Cited

U.S. PATENT DOCUMENTS

2013/0094552 A1 4/2013 Vedantham et al.
2013/0214738 A1 8/2013 Chen et al.
(Continued)

OTHER PUBLICATIONS

Extended European search report and Search Opinion, EP App. No. 22788964.9, Feb. 6, 2025, 13 pages.
(Continued)

*Primary Examiner* — David V Henze-Gongola
(74) *Attorney, Agent, or Firm* — NICHOLSON DE VOS WEBSTER & ELLIOTT LLP

(57) ABSTRACT

An attached cable circuitry assembly of an electric vehicle supply equipment (EVSE) that includes a charging protocol controller. The charging protocol controller includes a first connector to terminate one or more signal wires of a charging cable. The charging protocol controller further includes a second connector to connect via a cable to a third connector of the EVSE, the second connector to terminate supply voltage and communication from the EVSE received over the cable that connects the second connector to the third connector. The charging protocol controller further includes one or more charging communication circuits. The charging protocol controller further includes a processor to perform: signal handshake and control, and communication between the EVSE and the charging protocol controller.

16 Claims, 11 Drawing Sheets

(51) Int. Cl.
  *B60L 53/62* (2019.01)
  *B60L 53/66* (2019.01)

(56) References Cited

U.S. PATENT DOCUMENTS

| | | |
|---|---|---|
| 2013/0219084 A1 | 8/2013 | Wu et al. |
| 2014/0015482 A1* | 1/2014 | Nitzberg ............... B60L 53/305 |
| | | 320/109 |
| 2016/0347191 A1* | 12/2016 | Hayashigawa ......... B60L 53/65 |
| 2020/0198478 A1* | 6/2020 | Shin .................. H02J 7/007182 |

OTHER PUBLICATIONS

Final Office Action, U.S. Appl. No. 17/230,809, Aug. 25, 2023, 20 pages.
International Search Report and Written Opinion, PCT App. No. PCT/US2022/024898, Aug. 5, 2022, 14 pages.
Non-Final Office Action, U.S. Appl. No. 17/230,809, Dec. 21, 2022, 17 pages.

\* cited by examiner

ELECTRIC VEHICLE CHARGING SYSTEM WITH A CHARGING PROTOCOL CONTROLLER INCLUDED IN ATTACHED CABLE CIRCUITRY

CROSS-REFERENCE TO RELATED APPLICATIONS

This application is a divisional of U.S. application Ser. No. 17/230,809, filed Apr. 14, 2021, which is hereby incorporated by reference.

FIELD

Embodiments of the invention relate to the field of electric vehicle charging; and more specifically, to an electric vehicle charging system with a charging protocol controller included in attached cable circuitry.

BACKGROUND

Electric Vehicle Service Equipment (EVSE), sometimes referred to as an electric vehicle charging dispenser, is used for charging electric vehicles. There are several different EV charging standards and charging communication protocols that each require different physical interfaces, signaling, voltages, and safety compliance elements. These differences require circuit and software designs that do not share common or reusable blocks within an EVSE. Thus, an EVSE which is designed to support multiple standards conventionally needs different circuit and software components. Further, if a standard or protocol is changed or added, an EVSE would need to be updated in the field or replaced to support the change or new standard or protocol. Updating existing EVSE product electronic designs requires significant electronic modification of the communication circuitry.

An electric vehicle may connect to an EVSE through a cable (referred herein as a charging cable) that carries power and often carries required communication signaling. For instance, SAE J1772, which is a standard for electrical connectors for electric vehicles, is designed to work with a charging cable that carries power wires, a ground wire, a control pilot signal wire, and a proximity detection signal wire. Most charging cables are passive cables (sometimes referred to as "dumb" cables) that simply pass-thru signaling data and power.

Some charging cables include an inline EVSE controller that separates a utility plug side of the cable where the cable is plugged into utility power, and an electric vehicle connector side of the cable where the cable is plugged into an electric vehicle. An example inline EVSE controller compliant to SAE J1172 essentially provides a complete EVSE including contactors on the power lines to open and close to provide or shut off power to the electric vehicle, a voltage sensor to sense voltage, a temperature sensor to monitor temperature inside the inline controller, a pulse generator to control a pulsed duty cycle as a signal to the EV for the maximum allowable charging current that may be drawn, a ground fault sensor, and a microprocessor to implement communication protocols with the electric vehicle standard such as those defined by SAE J1772. Such an inline EVSE controller terminates the power wires and the signal wires. Such an embedded controller generally only communications with specific EV and cannot provide charging telemetry details.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
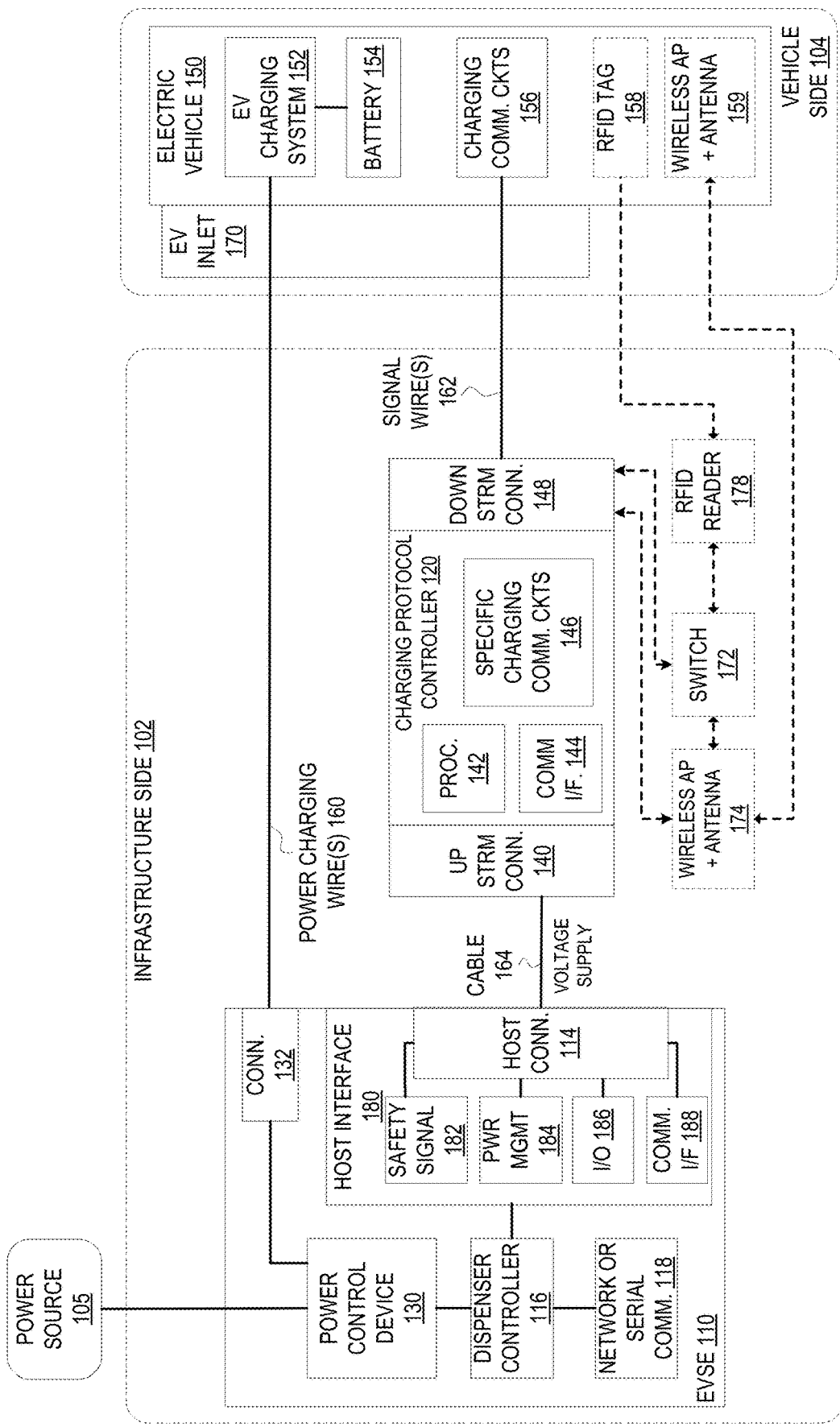
FIG. 1 illustrates an exemplary electric vehicle charging system that includes an electric vehicle service equipment (EVSE) that is used for charging electric vehicles such as the electric vehicle and a charging protocol controller that handles charger to EV communication, according to an embodiment.

An electric vehicle charging system is described that includes an electric vehicle service equipment (EVSE) and a charging protocol controller that handles charger to EV communication. The charging protocol controller includes a processor that manages the states of EV charging and the requests for power delivery. The processor performs the specific downstream communication with the electric vehicle and communicates upstream with the EVSE electronics. The charging protocol controller may also support peripheral features specific and local to the cable functions such as electrical contact temperature sensing and cable to electric vehicle connection detection (e.g., proximity detection). The charging protocol controller may also control charging port status light functionality. The charging protocol controller includes a non-volatile memory that, among other things, stores an identifier that indicates its supported EV protocol that may be presented to the EVSE to allow the EVSE to know the type of cable (one or more cables) that the EVSE may then use to configure to support power and/or protocol type. The EVSE may be designed with a common upstream signal, power, and physical connector interface that provides a common interface supporting different charging protocol controllers that provide specific interface requirements, signaling, and power, for different EV charging protocols. The EVSE and the charging cable controller may each have a common connector that standardizes upstream signal termination and controller operating power across multiple EVSE platforms.

If a new and/or different charging configuration or combination is created, the assembly that includes the charging protocol controller can be field upgraded or reconfigured to support the new and/or different charging configuration or combination instead of a costly replacement or infield reconfiguring of the EVSE electronics. Replacing or reconfiguring the charging protocol controller assembly, which may be field replaceable, is less expensive and less time consuming than replacing or reconfiguring an EVSE (typically replacing or reconfiguring many circuits and wiring harnesses within the EVSE). Further, since a common connector may connect the EVSE and the charging protocol controller, the EVSE may be configured with multiple charging communication protocols (which may be the same or different). Also, integrated electronics significantly reduces fixed circuit component cost in EVSEs that support multiple EV standards and multiple EV cables.

In an embodiment, the charging protocol controller is included within the charging cable and is an inline cable controller. The charger to EV communication electronic circuits are included in the charging cable instead of being included in EVSE electronics as conventional. In this case, unlike conventional charging cables that are passive, the charging cable described herein includes an inline cable controller that performs signal communication with the electric vehicle. If a new and/or different charging configuration or combination is created, the charging cable can be field upgraded (e.g., replaced) to support the new and/or different charging configuration instead of a costly replacement or infield reconfiguring of EVSE electronics.

In another embodiment, the charging protocol controller is included in a socket assembly of the EVSE, where the socket assembly is field replaceable and/or reconfigurable. In such an embodiment, if a new and/or different charging configuration or combination is created, the socket assembly of the EVSE can be field upgraded (e.g., replaced) and/or reconfigured to support the new and/or different charging configuration instead of a costly replacement or infield reconfiguring of EVSE electronics.

In another embodiment, the charging protocol controller is included in an attached cable circuitry assembly of the EVSE, where the attached cable circuity assembly is field replaceable and/or reconfigurable. In such an embodiment, if a new and/or different charging configuration or combination is created, the attached cable circuitry assembly of the EVSE can be field upgraded (e.g., replaced) and/or reconfigured to support the new and/or different charging configuration instead of a costly replacement or infield reconfiguring of EVSE electronics.

In another embodiment, the charging protocol controller is included in a charging cable connector assembly of the charging cable, where the charging cable connector assembly and/or the charging cable is field replaceable and/or reconfigurable. In such an embodiment, if a new and/or different charging configuration or combination is created, the charging cable connector assembly and/or the charging cable can be field upgraded (e.g., replaced) and/or reconfigured to support the new and/or different charging configuration instead of a costly replacement or infield reconfiguring of EVSE electronics.

In another embodiment, the charging protocol controller is included in a plug assembly of the charging cable, where the plug assembly and/or the charging cable is field replaceable and/or reconfigurable. In such an embodiment, if a new and/or different charging configuration or combination is created, the plug assembly and/or the charging cable can be field upgraded (e.g., replaced) and/or reconfigured to support the new and/or different charging configuration instead of a costly replacement or infield reconfiguring of EVSE electronics.

In another embodiment, the charging protocol controller manages the states of EV charging and the requests for power delivery and communicates with external equipment such as an automatic connection device (ACD), automated actuation controller (AAC), network switch, RFID reader, and/or wireless access point.

An electric vehicle charging system is described that includes an electric vehicle service equipment (EVSE) and a charging protocol controller that handles charger to EV communication. The charging protocol controller includes a processor that manages the states of EV charging and the requests for power delivery. The processor performs the specific downstream communication with the electric vehicle and communicates upstream with the EVSE electronics. The charging protocol controller may also support peripheral features specific and local to the cable functions such as electrical contact temperature sensing and cable to electric vehicle connection detection (e.g., proximity detection). The charging protocol controller includes a non-volatile memory that, among other things, stores an identifier that indicates its supported EV protocol that may be presented to the EVSE to allow the EVSE to know the type of cable (one or more cables) that the EVSE may then use to configure to support power and/or protocol type. The EVSE may be designed with a common upstream signal, power, and physical connector interface that provides a common interface supporting different charging protocol controllers that provide specific interface requirements, signaling, and power, for different EV charging protocols. The EVSE and the charging cable controller may each have a common connector that standardizes upstream signal termination and controller operating power across multiple EVSE platforms.

FIG. 1 illustrates an exemplary electric vehicle charging system that includes an electric vehicle service equipment (EVSE) 110 (sometimes referred to as a charging dispenser or power link) that is used for charging electric vehicles such as the electric vehicle 150 (e.g., electric battery powered vehicles, gasoline/electric battery powered vehicle hybrid, etc.) and a charging protocol controller 120 that handles charger to EV communication. The charging system includes an infrastructure side 102 and a vehicle side 104. The charging infrastructure side 102 includes the EVSE 110 and the charging protocol controller 120. The charging infrastructure side 102 may also include one or more other components such as a switch 172 (e.g., an Ethernet switch), a wireless access point and antenna 174, and/or an RFID reader 178.

The EVSE 110 delivers AC power and/or DC power to the electric vehicle 150. The EVSE 110 connects to the power source 105, possibly through one or more other electrical components not shown including a circuit breaker, to supply power for charging electric vehicles. The power source 105 may be a power grid, or battery storage in renewal energy, that is owned and/or operated by local utility companies or owned and/or operated by private persons/companies.

The EVSE 110 includes the dispenser controller 116, the power control device 130, the wire connector(s) 132, the host interface 180, and optional network or serial communication modules 118.

The power control device 130 includes circuitry for electrically connecting the power source 105 and the electric vehicle 150. The power control device 130 can energize and de-energize to allow or prevent energy from being transferred between the power source 105 and the electric vehicle 150. For example, the power control device 130 may include a set of one or more contactors or other devices on one or more power lines for turning on or off charge transfer between the electric vehicle 150 and the EVSE 110. The power control device 130 may include circuity to variably control the amount of power draw (e.g., Pulse Width Modulation (PWM) circuitry). The power control device 130 may be under control of the dispenser controller 116 to energize or de-energize and/or match voltage and current as appropriate per EV charging requirements. The dispenser controller 116 includes a processor and a non-volatile memory (e.g., a non-transitory machine-readable storage medium) and provides for central control over the EVSE 110. For instance, the dispenser controller 116 manages the power control device 130 such as causing the contactor(s) to open and close as appropriate. For instance, the dispenser controller 116 may drive a signal to the power control device 130 to cause it to energize or de-energize the charging circuitry. The dispenser controller 116 may cause the power control device 130 to energize or de-energize based on messages received from an external server (e.g., a message that indicates that the electric vehicle operator requesting charging is authorized) and/or messages received from the charging protocol controller 120. The dispenser controller 116 can receive and send messages through the upstream interface to the downstream electric vehicle 150. The dispenser controller 116 may also include and execute an operating system for the EVSE 110. The operating system manages certain hardware and software for the EVSE including one or more of: a set of one or more network or serial communication modules 118 to communicate with a network (e.g., a Wide Area Network (WAN) module and/or a Local Area Network (LAN) module to communicate with a WAN and/or LAN network); a display module to manage a display of the EVSE 110; a Radio Frequency Identification (RFID) module for managing an RFID transceiver. The dispenser controller 116 also interfaces with the host interface 180.

The optional network or serial communication module(s) 118 allow the EVSE 110 to communicate with a network. The network or serial communication module(s) 118 may include a wide area network (WAN) link such as a cellular link (e.g., CDMA, GRPS, etc.), Wi-Fi Internet connection, wired internet connection, etc., and/or a local area network (LAN) link such as Bluetooth, Zigbee, Ethernet, Power Line Communication (PLC), etc. The network may include one or more servers that provide services for electric vehicle charging such as authorization service, accounting service, and reporting service. The network may also be used to update the EVSE 110 including updating the EVSE 110 with firmware and/or software to support any new charging communication protocol or updates/changes to an existing charging communication protocol.

Although not shown in FIG. 1, the EVSE 110 may include one or more additional components. For instance, the EVSE 110 may include a meter (e.g., a current measuring device) to measure current drawn by the electric vehicle 150. As another example, the EVSE 110 may include one or more components for cooling control (e.g., controlling a liquid cooled charging cable). As another example, if the EVSE 110 supports DC charging, the EVSE 110 would include an AC to DC power conversion component (e.g., an off-board charger) for converting AC power to DC power. As another example, the EVSE 110 may include status lights that may be controlled by the charging protocol controller.

Unlike a conventional EVSE, in an embodiment the EVSE 110 does not include or use circuitry for sourcing a control pilot signal to the electric vehicle 150. Instead, and as described in detail later herein, the charging protocol controller 120 performs signaling with the electric vehicle 150 such as sourcing a control pilot signal to the electric vehicle 150.

The EVSE 110 connects to electric vehicles for charging through a charging cable or in some cases through a wireless connection. For example, in wired charging, a charging cable connector is attached to a charging cable and is designed to be attached to on-board electronics of the electric vehicle 150 through an electric vehicle inlet 170. The charging cable connector connects the power charging wire(s) 160 and the signal wire(s) 162 to the electric vehicle inlet 170. The charging cable connector may be a standard connector such as a Combined Charging System (CSS) Type 1 connector, a CSS Type 2 connector, a CHAdeMO connector; a connector capable of connecting to Tesla Motors™ vehicles, a GB connector, and/or any other connector that attaches to an electric vehicle. The EVSE 110 may include multiple cables to charge one or more electric vehicles.

The electric vehicle 150 includes the EV charging system 152 for supplying power to the battery 154. In the case of AC charging, the EV charging system 152 includes an on-board charger component that converts the input AC power to DC power for charging the battery 154, and any other equipment required to condition and transfer energy from the constant frequency, constant supply voltage supply network to the direct current, variable voltage battery bus for the purposes of charging the battery 154. In the case of DC charging, the EV charging system 152 may include charge contactors and any other equipment required for charging the battery 154. In case the electric vehicle 150 supports both AC and DC charging, the EV charging system 152 may include an on-board charging component that is bypassed if DC charging is used. The electric vehicle 150 also includes charging communication circuits 156 such as a pilot level control circuitry and proximity detection circuitry. The proximity detection circuitry is used for detecting the presence of the charging cable connector in the EV inlet 170. For instance, the proximity detection circuitry of the electric vehicle 150 may detect when a proximity switch in the charging cable connector is actuated and cause the pilot level control circuitry to change the voltage of the pilot signal to signal the removal of charging voltage from the charging cable. For instance, the pilot level control circuitry of the electric vehicle 150 is used for controlling charging of the EV 150. The pilot level-control circuitry and the proximity detection circuitry can be incorporated into the EV charging system 152.

The power charging wire(s) 160 are included in a charging cable and carry power between the EVSE 110 and the electric vehicle 150. The power transfer may be for charging the electric vehicle 150 or for a "vehicle-to-grid" (V2G)

where power transfer is from the electric vehicle 150 to the power source 105. By way of example, in the case of AC charging, the power charging wires 160 may include one or more live wires and a neutral wire, and in the case of DC charging, the power charging wires 160 may include one or more DC positive wires and one or more DC negative positive wires, and in the case the EVSE 110 supports both AC and DC charging, the power charging wires 160 may include one or more live wires and neutral wires for AC charging, and one or more DC positive wires and one or more DC negative positive wires for DC charging. In an embodiment, the one or more power charging wire(s) 160 are terminated at the wire connector(s) 132 at the EVSE 110 that are connected to contactors of the power control device 130 of the EVSE 110. Although not illustrated in FIG. 1, the charging cable also includes one or more ground wires for providing a continuous ground in the charging system.

The charging cable also includes one or more signal wires 162 to carry signaling data relating to charging the electric vehicle 150. The number and type of signal wires 162 may be different depending on the EV charging standard and charging communication protocol that is being used. For instance, the one or more signal wires 162 may include different wires for different protocols. For example, to support the SAE J1772 standard, the signal wires 162 may include a control pilot signal wire for carrying signal data for a control pilot signal and a proximity detection signal wire for carrying signal data related to connector proximity detection. As another example, to support the ChaDeMo standard, the signal wires 162 may include a charge sequence signal 1 wire and a charge sequence signal 2 wire for starting and stopping charging, a vehicle charge permission signal wire for carrying signal data for whether the vehicle has given permission to charge, and Controller Area Network (CAN)—High wire and CAN-Low wire to carry data over a CAN bus.

The charging protocol controller 120 performs specific signal communication with the electric vehicle 150 (e.g., translation or pass-thru). The EVSE 110, through interaction with the charging protocol controller 120, supports multiple different EV charging standards and charging communication protocols. The EVSE 110 includes common signal, power, and physical connector interface to work with different charging protocol controllers providing different signaling for different charging communication protocols. For instance, the EVSE 110 includes the host interface 180 that includes the host connector 114, which is a common physical connector interface that can interface with different charging protocol controllers providing different signaling and/or charging communication protocols. In turn, the charging protocol controller 120 may include a common signal, power, and physical connector interface (e.g., the upstream connector 140) for interfacing with the EVSE 110. The host connector 114 and the upstream connector 140 may be the same regardless of which EV charging standard and charging communication protocol is being used. A cable 164 (e.g., a serial cable) includes a connector that mates with the host connector 114 of the EVSE 110 and a connector that mates with the upstream connector 140.

The host interface 180 includes physical electrical connections for communication, power, and optionally logic signals to support the charging protocol controller 120. The host interface 180 includes the power management circuitry 184 that provides supply voltage to support the electronics on the charging protocol controller 120 (e.g., chip(s) and/or circuit(s)) and may be extended to meet standard signaling requirements. The supply voltage may be a single voltage or multiple voltages. The supply voltage is carried over the cable 164 in an embodiment.

The host interface 180 includes the communication interface circuitry 188 to support communication between the EVSE 110 and the charging protocol controller 120. The communication may be a serial communication or other communication protocol (e.g., Ethernet). By way of example, serial digital communication minimizes cable wires and connector size, and minimizes cable assembly complexity, size, and manufacturing cost. The communication may include EV standard management and data and cable support information such as temperature sensor data, LED illumination control, safety conditions, fault alerts, etc. The communication interface 188 may be a serial interface such as universal serial bus (USB), serial peripheral interface (SPI) or SPI over low-voltage differential signaling (LVDS), or universal asynchronous receiver/transmitter (UART), or may be another type of communication interface such as an Ethernet interface. The communication may be signed and/or encrypted. The communication is carried over the cable 164 in an embodiment.

The host interface 180 optionally includes a safety signal circuitry 182 that can be used for detecting and responding to safety or failures. The host interface 180 includes input/output circuitry 186 for providing logical signals to the charging protocol controller 120. These logical signals can be used for managing the charging protocol controller 120, for example. Example logical signals include a reset signal (e.g., resetting the processor 142 of the charging protocol controller 120), power good signal (voltage regulator over current/load detect, etc.), production programming control, and a dedicated safety signal (e.g., support for Automotive Safety Integrity Level (ASIL) or UL2231-2 compliance). The logical signal(s) may be controlled by the dispenser controller 116.

The host interface 180 may be included on a main PCB of the EVSE 110. The EVSE 110 may include a host interface 180 per charging cable if the EVSE 110 supports multiple charging cables. Alternatively, a single host interface 180 with multiple host connectors may be shared across multiple charging cables.

In an embodiment, there is one host interface 180 for each cable and EV protocol type on the EVSE 110. In an exemplary dispenser that supports three cables and three different EV protocols, the host interface 180 includes 9, 3×3, blocks of electronic circuitry. In another embodiment, there is a single host interface 180 for all cable and EV protocol types on the EVSE 110.

The upstream connector 140 of the charging protocol controller 120 terminates the common connector signals from the EVSE 110. Thus, the upstream connector 140 terminates the supply voltage received from the EVSE 110 to support the electronics on charging protocol controller 120 and terminates communications from the EVSE 110. The upstream connector 140 may also terminate logical signals received from the EVSE 110 for managing the charging protocol controller 120, for example.

The charging protocol controller 120 also includes the downstream connector 148 that connects the charging protocol controller 120 with the electric vehicle 150. The downstream connector 148 terminates the signal wire(s) 162 that carry signaling data relating to charging the electric vehicle 150. In an embodiment, the downstream connector 148 does not terminate the power charging wire(s) 160. Thus, charging protocol controller 120 provides wire termination of both the EV cable signals (via the downstream connector 148) and the common connector signals (via the upstream connector 140), but not the power charging wire(s) 160. In an embodiment, the charging protocol controller 120 does not include a power control device such as contactor(s) to control the on/off power for the power charging wire(s) 160. Unlike the upstream connector 140 that is common across different types of EV charging standards and charging communication protocols, the downstream connector 148 may be different for different EV charging standards and charging communication protocols. For instance, if the charging protocol controller 120 is designed to support SAE J1772, the downstream connector 148 may include connections to terminate a proximity detection signal wire and a control pilot signal wire according to SAE J1772. As a superset to J1772, the CCS standard per DIN15188 adds Power-Line-Communications over the Pilot wire to support TCP/IP communication between the EVSE and EV. As another example, if the charging protocol controller 120 is designed to support CHAdeMO, the downstream connector 148 may include connections to terminate a charge sequence signal 1 wire, a vehicle charge permission wire, a connector proximity detection wire, a CAN—high wire, a CAN—low wire, and a charge sequence signal 2 wire according to CHAdeMO. Instead of, or in addition to, wired communication to the EV 150, the charging protocol controller 120 may include a wireless communication module (e.g., radio) to communicate wirelessly with the EV 150.

The charging protocol controller 120 includes the specific charging communication circuits 146. The specific circuits included in the specific charging communication circuits 146 depend on the EV charging protocol that is supported by the charging protocol controller 120. The specific charging communication circuits 146 are used for performing the signaling requirements for the specific EV charging communication protocol. For instance, if the charging protocol controller 120 is designed to support SAE J1772, the specific charging communication circuits 146 may include a proximity detection circuit and a control pilot circuit according to SAE J1772. The control pilot circuit may source a signal to perform one or more of the following functions: verifies that the electric vehicle 150 is present and connected, permits energization/de-energization of the supply, transmits available supply current to the electric vehicle 150, monitors the presence of the equipment ground, and specifics vehicle ventilation requirements. The proximity detection circuit is used to support monitoring detection of the presence of the charging cable connector in the EV inlet 170 via the proximity switch and sensors 265 included in the charging cable connector. For instance, if an operator unlatches the connector (e.g., presses an unlatch button on the charging cable connector), the proximity switch sends a signal to the charging protocol controller 120 that the connection is about to be broken, and the charging protocol controller 120 transmits a message to the EVSE 110 to open the contactor(s) and/or drop power gracefully. As another example, if the charging protocol controller 120 is designed to support ISO 15118, the specific charging communication circuits 146 may include a control pilot circuit and a proximity detection circuit according to ISO 15118. As another example, if the charging protocol controller 120 is designed to support CHAdeMO, the specific charging communication circuits 146 may include a charge sequence circuit, a latch holding control circuit, and a proximity detection circuit according to CHAdeMO. The charge sequence circuit may be used for establishing charging sequence with the electric vehicle 150. The latch holding control circuit may control a latch holding circuit that holds the latch of the charging cable connector to prevent the detachment of the charging cable connector 235 from the EV inlet 170 during charging. The proximity detection circuit may be used to determine that the charging cable connector is mated with the EV inlet 170.

The specific charging communication circuits 146 may also include circuitry for communicating between the charging protocol controller 120 and the electric vehicle 150 (e.g., to exchange the proper parameters), such as circuitry for CAN communication or circuitry for Power Line Communication (PLC).

The charging protocol controller 120 includes a processor 142, which is a microprocessor, controller, microcontroller, central processing unit, digital signal processor, application specific integrated circuit, field programmable gate array, other electronic circuitry, a combination of one or more of the preceding, that is coupled to one or more non-transitory machine-readable storage media to store code for execution on the processor 142 and/or to store data. The processor 142 provides signal handshake and control, measurements, and the embedded intelligence required per the specific EV charging standard. The processor 142 also effects the communication from the charging protocol controller 120 to the EVSE 110. For instance, the processor 142 establishes communication between the electric vehicle 150 and the EVSE 110 (e.g., through communication such as serial or Ethernet) and relays data between the electric vehicle 150 and the EVSE 110.

The charging protocol controller 120 includes the communication interface circuitry 144 to support communication between the charging protocol controller 120 and the EVSE 110 such as serial communication or Ethernet communication. The communication may include EV standard management and data and cable support information such as sensor data (e.g., temperature sensor data), LED illumination control, safety conditions, fault alerts, etc. The communication interface circuitry 144 may be a serial interface such as universal serial bus (USB), serial peripheral interface (SPI) or SPI over low-voltage differential signaling (LVDS), or universal asynchronous receiver/transmitter (UART), or may be another type of communication interface such as an Ethernet interface. Although not illustrated in FIG. 1, the charging protocol controller 120 may also include an on-board voltage regulator.

Although not shown in FIG. 1, the charging protocol controller 120 may support peripheral features specific and local to the cable functions such as electrical contact temperature sensing and cable to electric vehicle connection detection (e.g., proximity detection). For example, the processor 142 may transmit EV proximity status (e.g., connected modes) to the EVSE 110 for processing.

The charging protocol controller 120 may include one or more sensors and/or receive sensor data from one or more sensors included within the charging cable. The one or more sensors can include including temperature sensor(s), voltage sensor(s), current sensor(s), pressure sensor(s), fluid leak detection sensor(s), handle moisture sensor(s), cut or abrasion detection sensor(s), proximity sensor(s), touch sensor(s), and/or light sensor(s). The sensor data may be sent to the EVSE 110 for processing. For instance, the sensor data may indicate an unsafe condition or other error and the EVSE 110 may take one or more remedial actions. The remedial action(s) may include causing charging to be stopped completely or causing the current draw to be reduced and/or transmitting a notification message to the vehicle operator and/or the station operator alerting of the error or unsafe condition. In an embodiment, in addition to or in lieu of transmitting the sensor data to the EVSE 110, the charging protocol controller 120 may take one or more remedial actions if the sensor data indicates an unsafe condition or error condition without waiting for instructions from the EVSE 110.

For example, the charging protocol controller 120 may include temperature sensor(s) and/or receive temperature data from sensor(s) included within the charging cable (e.g., measuring temperature of the contacts, measuring temperature of the charging protocol controller 120). The processor 142 may transmit the temperature data to the EVSE 110 for processing (e.g., through the host connector 114 and the upstream connector 140). If, for example, the EVSE 110 receives temperature data from the charging protocol controller 120 that indicates that the temperature of the charging protocol controller 120 and/or a contact temperature exceeds a threshold, the EVSE 110 may take one or more remedial actions such as causing charging to be stopped or causing the current draw to be reduced. In an embodiment, the charging protocol controller 120 may, if it determines that temperature within the charging protocol controller 120 and/or a contact exceeds a threshold, may cause the current draw to be reduced by signaling (e.g., through pulse width modulation (PWM) of a pilot signal) a reduced available amount of current (a reduced maximum available continuous current capacity) to the electric vehicle 150.

The charging protocol controller 120 may include voltage sensor(s) and/or receive voltage data from voltage sensor(s) included within the charging cable. The processor 142 may transmit the voltage data to the EVSE 110 for processing (e.g., through the host connector 114 and the upstream connector 140). If, for example, the EVSE 110 receives voltage data that from the charging protocol controller 120 that indicates a voltage under a predefined threshold (an under-voltage situation) or voltage over a predefined threshold (an over-voltage situation), the EVSE 110 may take one or more remedial actions as described above. In an embodiment, if the voltage data indicates an unsafe or error condition (e.g., an under-voltage or over-voltage situation), the charging protocol controller 120 may take one or more remedial actions (e.g., causing charging to be stopped or causing the current draw to be reduced) without waiting for instructions from the EVSE 110.

The charging protocol controller 120 may include current sensor(s) and/or receive current data from current sensor(s) included within the charging cable. The current data can be used for metering and/or for monitoring the current of any conductor of the charging cable. The processor 142 may transmit the current data to the EVSE 110 for processing (e.g., through the host connector 114 and the upstream connector 140). The EVSE 110 can use the current data for metering. If the current data indicates an unsafe or error condition (e.g., the current exceeds a threshold for a conductor, the current is below a threshold), then the EVSE 110 can take one or more remedial actions as described above. In an embodiment, if the current data indicates an unsafe or error condition (e.g., an under-current or over-current situation), the charging protocol controller 120 may take one or more remedial actions (e.g., causing charging to be stopped or causing the current draw to be reduced) without waiting for instructions from the EVSE 110.

The charging protocol controller 120 may include pressure sensor(s) and/or receive pressure data from pressure sensor(s) included within the charging cable. In cases where the charging cable is a liquid cooled charging cable, the pressure data may indicate the pressure of the cooling fluid in the cable. As another example, the pressure sensors may measure external pressure applied to the charging cable (e.g., twisting and pulling the cable). The processor 142 may transmit the pressure data to the EVSE 110 for processing (e.g., through the host connector 114 and the upstream connector 140). The EVSE 110 and/or charging protocol controller 120 may take one or more remedial actions depending on the values of the pressure data, such as if the pressure data exceeds a threshold (indicating the pressure is greater than allowed limits) or is below a threshold (indicating low pressure below allowed limits).

The charging protocol controller 120 may include fluid leak detection sensor(s) and/or receive fluid leak data from fluid leak detection sensor(s) included within the charging cable (if the charging cable is a liquid cooled cable). The processor 142 may transmit the fluid leak data to the EVSE 110 for processing (e.g., through the host connector 114 and the upstream connector 140). The EVSE 110 and/or charging protocol controller 120 may take one or more remedial actions as described above if the fluid leak data indicates that there is a leak in the liquid cooled cable.

The charging protocol controller 120 may receive handle moisture sensor data from moisture sensors included within the connector of the charging cable. The processor 142 may transmit the handle moisture sensor data to the EVSE 110 for processing (e.g., through the host connector 114 and the upstream connector 140). The EVSE 110 and/or charging protocol controller 120 may take one or more remedial actions as described above if the handle moisture sensor data indicates that the moisture exceeds a threshold.

The charging protocol controller 120 may include cut or abrasion detection sensor(s) and/or receive cut or abrasion detection sensor data from sensors included within the charging cable. The processor 142 may transmit the cut or abrasion detection sensor data to the EVSE 110 for processing (e.g., through the host connector 114 and the upstream connector 140). The EVSE 110 and/or charging protocol controller 120 may take one or more remedial actions as described above if the cut or abrasion detection sensor data indicates that the charging cable has experienced a cut or abrasion that may impact safety or efficacy.

The charging protocol controller 120 stores configuration information. This configuration information may indicate the communication protocol supported by the charging protocol controller 120, the cable and/or connector type of the charging cable, and/or identify certain features supported by the charging cable (e.g., the number and type of sensor(s) available, maximum current it supports, threshold parameters for cable connection detection to an electric vehicle, cable factory dates, cable service life, environmental limitations, specific materials, customer specific branding, stored cable telemetry data and parameters to increase the accuracy in charging meteorology, etc.). This information can be different between different EV communication protocols, AC or DC charging, differing power level capabilities, etc. This information is transmitted to the EVSE 110 (e.g., upon power up of the EVSE 110) and the EVSE 110 configures its system to support that protocol, etc. For instance, the dispenser controller 116 may receive the configuration information and configure the system for supporting the identified charging communication protocol. By way of example, if the configuration information specifies that the charging protocol controller 120 supports the J1772 standard, the system may be configured to expect data for corresponding with the operations of J1772 such as managing the states of EV charging (e.g., States A-F).

In an embodiment, the charging protocol controller 120 is located within a charging cable. For instance, the charging protocol controller 120 may be positioned within sheathing of the charging cable; or positioned outside of the sheathing of the charging cable but still part of the charging cable subassembly (e.g., positioned inside the housing the EVSE 110).

Because the charging protocol controller 120 includes the specific charging communication circuits 146, those circuits are not required to be included in the EVSE 110 (e.g., the board of the EVSE 110). The host interface 180 establishes the common communication and power control for the charging protocol controller 120. The charging protocol controller 120 provides both upstream and downstream communication across the cable 164 including upstream communication with the dispenser controller 116 and downstream communication to the charging cable connector or with the EV inlet as required per the EV protocol.

Thus, the charging protocol controller 120 communicates with the electric vehicle with the specific protocol supported by the electric vehicle and charging cable and communicates with the EVSE 110. In an embodiment, the charging protocol controller 120 passes through the signaling messages to the host interface 180 which then interprets the messages and returns messages back to the charging protocol controller 120 for further action. For example, in the J1772 standard, the pilot voltage establishes the charging states and charging state information may be communicated from the charging protocol controller 120 to the host interface 180. The specific charging communication circuits 146 may include circuity for sourcing the control pilot signal and monitoring the change in voltage peaks of the pilot signal to determine charging states and faults. The charging protocol controller 120 sends messages that reflect the state changes to the host interface 180. The host interface 180 interprets the messages and returns messages to the charging protocol controller 120 regarding what to do next. For example, state A to state B indicates to the EVSE that the EV 150 is connected. The charging protocol controller 120, through the specific charging communications circuits 146 and the processor 142, can detect a 12V pilot change to 9V and communicate an indication of this state change to the host interface 180 (e.g., through the upstream connector 140 to the host connector 114). The host interface 180 receives the state change indication and determines the available continuous current capacity for the electric vehicle 150. The host interface 180 sends a message to the charging protocol controller 120 (e.g., through the host connector 114 to the upstream connector 140) to cause the charging protocol controller 120 to adjust the pilot duty cycle according to the determined available continuous current capacity. The charging protocol controller 120 receives the message and modulates the pilot duty cycle using the specific charging communication circuits 146 according to the determined available continuous current capacity to signal to the EV 150 the available current. The EV 150 signals that is ready to charge (transitioning from state B to state C or D) with a voltage change from 9V to 6V or 9V to 3V. The charging protocol controller 120, through the specific charging communications circuits 146 and the processor 142, can detect the 9V pilot change to 6V or 3V and communicate an indication of this state change to the host interface 180 (e.g., through the upstream connector 140 to the host connector 114). The host interface 180 receives the state change indication that causes the dispenser controller 116 to cause the power control device 130 to energize the charging circuitry (e.g., close a set of one or more contactors for allowing charge transfer between the EV 150 and the EVSE 110).

As previously described, the charging infrastructure side 102 may include the switch 172 (e.g., an Ethernet switch), a wireless access point and antenna 174, and/or an RFID reader 178. The switch 172 may be coupled to the charging protocol controller 120 and coupled with the wireless access point and antenna 174 and coupled with the RFID reader 178. The electric vehicle 150 may include the wireless access point and antenna 159 for communicating wirelessly with the wireless access point and antenna 174 of the charging infrastructure. For instance, after establishing communication with the infrastructure over a wired connection (such as over the signal wires 162), the electric vehicle 150 and the charging protocol controller 120 can communicate with each other over a wireless connection such as Wi-Fi, using the wireless AP antennas. The electric vehicle 150 may include the RFID tag 158 that can be read by the RFID reader 178 of the charging infrastructure to assist with pairing wireless access points in areas with many wireless access points such as a vehicle depot.

The charging protocol controller 120 may be located in different spots in the charging infrastructure side 102. For instance, in some embodiments, the charging protocol controller 120 is included within a charging cable, which will be described in greater detail with respect to FIG. 2. In some embodiments, the charging protocol controller 120 is included in a socket assembly of the EVSE, which is described in greater detail with respect to FIG. 3. In some embodiments, the charging protocol controller 120 is included in an attached cable circuitry assembly of the EVSE, which is described in greater detail with respect to FIG. 4. In some embodiments, the charging protocol controller 120 is included in a charging cable connector assembly of the charging cable, which is described in greater detail with respect to FIG. 5. In some embodiments, the charging protocol controller 120 is included in a plug assembly of the charging cable, which is described in greater detail with respect to FIG. 6.

Figure 2:
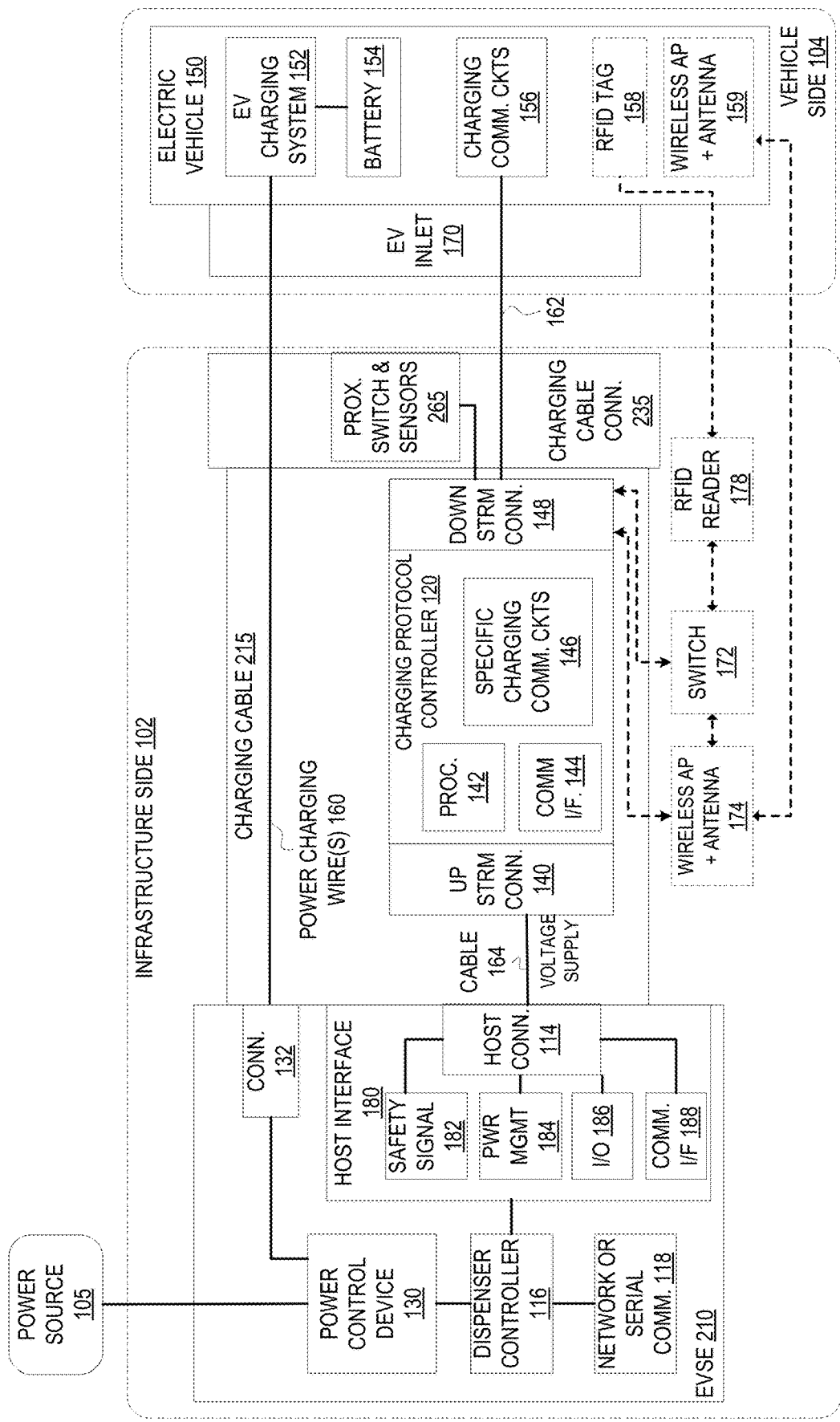
FIG. 2 illustrates an exemplary electric vehicle charging system that includes an electric vehicle service equipment (EVSE) with a charging cable that includes an inline cable controller according to an embodiment.

FIG. 2 illustrates an embodiment where the charging protocol controller 120 is included in a charging cable and is sometimes referred herein as an inline cable controller. Thus, the charger to EV communication electronic circuits are included in the charging cable instead of being included in EVSE electronics as conventional. In this case, unlike conventional charging cables that are passive, the charging cable described herein includes an inline cable controller that performs signal communication with the electric vehicle. If a new and/or different charging configuration or combination is created, the charging cable can be field upgraded (e.g., replaced) to support the new and/or different charging configuration instead of a costly replacement or infield reconfiguring of EVSE electronics.

The EVSE 210 is like the EVSE 110 with the additional detail that the EVSE 210 connects to electric vehicles for charging through a charging cable such as the charging cable 215. For instance, like FIG. 1, the EVSE 210 connects to the power source 105 and includes the dispenser controller 116, the power control device 130, the host interface 180, and optional network or serial communication modules 118. Like the EVSE 110, the EVSE 210 may include one or more additional components that are not shown in FIG. 2. For instance, the EVSE 210 may include a meter (e.g., a current measuring device) to measure current drawn by the electric vehicle 150. As another example, the EVSE 210 may include one or more components for cooling control (e.g., controlling a liquid cooled charging cable).

As shown in FIG. 2, the EVSE 210 connects to electric vehicles for charging through a charging cable such as the charging cable 215. The charging cable connector 235 is attached to the charging cable 215 and is designed to be plugged into on-board electronics of an electric vehicle 150 through the electric vehicle inlet 170. The charging cable connector 235 connects the power charging wire(s) 160 and the signal wire(s) 162 to the electric vehicle inlet 170. The charging cable connector 235 may be a standard connector such as a Combined Charging System (CSS) Type 1 connector, a CSS Type 2 connector, a CHAdeMO connector; a connector capable of connecting to Tesla Motors™ vehicles, a GB connector, and/or any other connector that attaches to an electric vehicle. Although one cable is shown in FIG. 2, the EVSE 210 may be connected with multiple cables to charge one or more electric vehicles.

Unlike as shown in FIG. 1, the charging cable 215 includes the charging protocol controller 120 that performs specific signal communication with the electric vehicle 150 (e.g., translation or pass-thru). The EVSE 210, through interaction with the charging protocol controller 120 of the charging cable 215, supports multiple different EV charging standards and charging communication protocols. The charging protocol controller 120 may include a proximity detection circuit as part of the specific charging communication circuits 146 to support monitoring detection of the presence of the charging cable connector 235 in the EV inlet 170 via the proximity switch and sensors 265 included in the charging cable connector 235. For instance, if an operator unlatches the connector (e.g., presses an unlatch button on the charging cable connector 235), the proximity switch sends a signal to the charging protocol controller 120 that the connection is about to be broken, and the charging protocol controller 120 transmits a message to the EVSE 210 to open the contactor(s) and/or drop power gracefully.

Although not shown in FIG. 2, the charging protocol controller 120 may support peripheral features specific and local to the cable functions such as electrical contact temperature sensing and cable to electric vehicle connection detection (e.g., proximity detection). For example, the processor 142 may transmit EV proximity status (e.g., connected modes) to the EVSE 210 for processing. Like as described with respect to FIG. 1, the charging protocol controller 120 may include one or more sensors and/or receive sensor data from one or more sensors included within the charging cable. The one or more sensors can include including temperature sensor(s), voltage sensor(s), current sensor(s), pressure sensor(s), fluid leak detection sensor(s), handle moisture sensor(s), cut or abrasion detection sensor(s), proximity sensor(s), touch sensor(s), and/or light sensor(s). The sensor data may be sent to the EVSE 110 for processing. For instance, the sensor data may indicate an unsafe condition or other error and the EVSE 110 may take one or more remedial actions. The remedial action(s) may include causing charging to be stopped completely or causing the current draw to be reduced and/or transmitting a notification message to the vehicle operator and/or the station operator alerting of the error or unsafe condition. In an embodiment, in addition to or in lieu of transmitting the sensor data to the EVSE 110, the charging protocol controller 120 may take one or more remedial actions if the sensor data indicates an unsafe condition or error condition without waiting for instructions from the EVSE 110.

For example, the charging protocol controller 120 may include temperature sensors and/or receive temperature data from a sensor included within the charging cable 215 (e.g., measuring temperature of the contacts, measuring temperature of the charging protocol controller 120). The processor 142 may transmit the temperature data to the EVSE 210 for processing (e.g., through the host connector 114 and the upstream connector 140). If, for example, the EVSE 210 receives temperature data from the charging protocol controller 120 that indicates that the temperature of the charging protocol controller 120 and/or a contact temperature exceeds a threshold, the EVSE 210 may take one or more remedial actions such as causing charging to be stopped or causing the current draw to be reduced. In an embodiment, the charging protocol controller 120 may, if it determines that temperature within the charging protocol controller 120 and/or a contact exceeds a threshold, may cause the current draw to be reduced by signaling (e.g., through pulse width modulation (PWM) of a pilot signal) a reduced available amount of current (a reduced maximum available continuous current capacity) to the electric vehicle 150.

The charging protocol controller 120 stores configuration information. This configuration information may indicate the communication protocol supported by the charging protocol controller 120, the cable and/or connector type of the charging cable 215, and/or identify certain features supported by the charging cable 215 (e.g., the number and type of sensor(s) available, maximum current it supports, threshold parameters for cable connection detection to an electric vehicle, cable factory dates, cable service life, environmental limitations, specific materials, customer specific branding, stored cable telemetry data and parameters to increase the accuracy in charging meteorology, etc.). This information can be different between different EV communication protocols, AC or DC charging, differing power level capabilities, etc. This information is transmitted to the EVSE 210 (e.g., upon power up of the EVSE 210) and the EVSE 210 configures its system to support that protocol, etc. For instance, the dispenser controller 116 may receive the configuration information and configure the system for supporting the identified charging communication protocol. By way of example, if the configuration information specifies that the charging protocol controller 120 supports the J1772 standard, the system may be configured to expect data for corresponding with the operations of J1772 such as managing the states of EV charging (e.g., States A-F). In an embodiment, the charging protocol controller 120 is positioned within sheathing of the charging cable 215. In another embodiment, the charging protocol controller 120 is positioned outside of the sheathing of the charging cable 215 but still part of the charging cable subassembly (e.g., positioned inside the housing the EVSE 210).

Because the charging cable 215 includes the charging protocol controller 120 that includes the specific charging communication circuits 146, those circuits are not required to be included in the EVSE 210 (e.g., the board of the EVSE 210). The host interface 180 establishes the common communication and power control for the charging cable 215 with the charging protocol controller 120. The charging protocol controller 120 provides both upstream and downstream communication across the cable 164 including upstream communication with the dispenser controller 116 and downstream communication to the charging cable connector 235 or with the EV inlet as required per the EV protocol.

Although the charging protocol controller 120 is shown as being included within the charging cable 215 in FIG. 2, at least some of the electronics may be included within the charging cable connector such as the charging cable connector 235 or be additional to the electronics of the charging protocol controller 120. By way of example, some electric vehicle inlets require an RF module within the charging cable connector that activates/release the door latch, which can be included within the charging cable connector 235 and communicate with the charging protocol controller 120. Although FIG. 2 shows the charging cable 215 being attached to the EVSE 210, the charging cable 215 may instead have a plug that is adapted to interface with a socket assembly of the EVSE 110.

Figure 3:
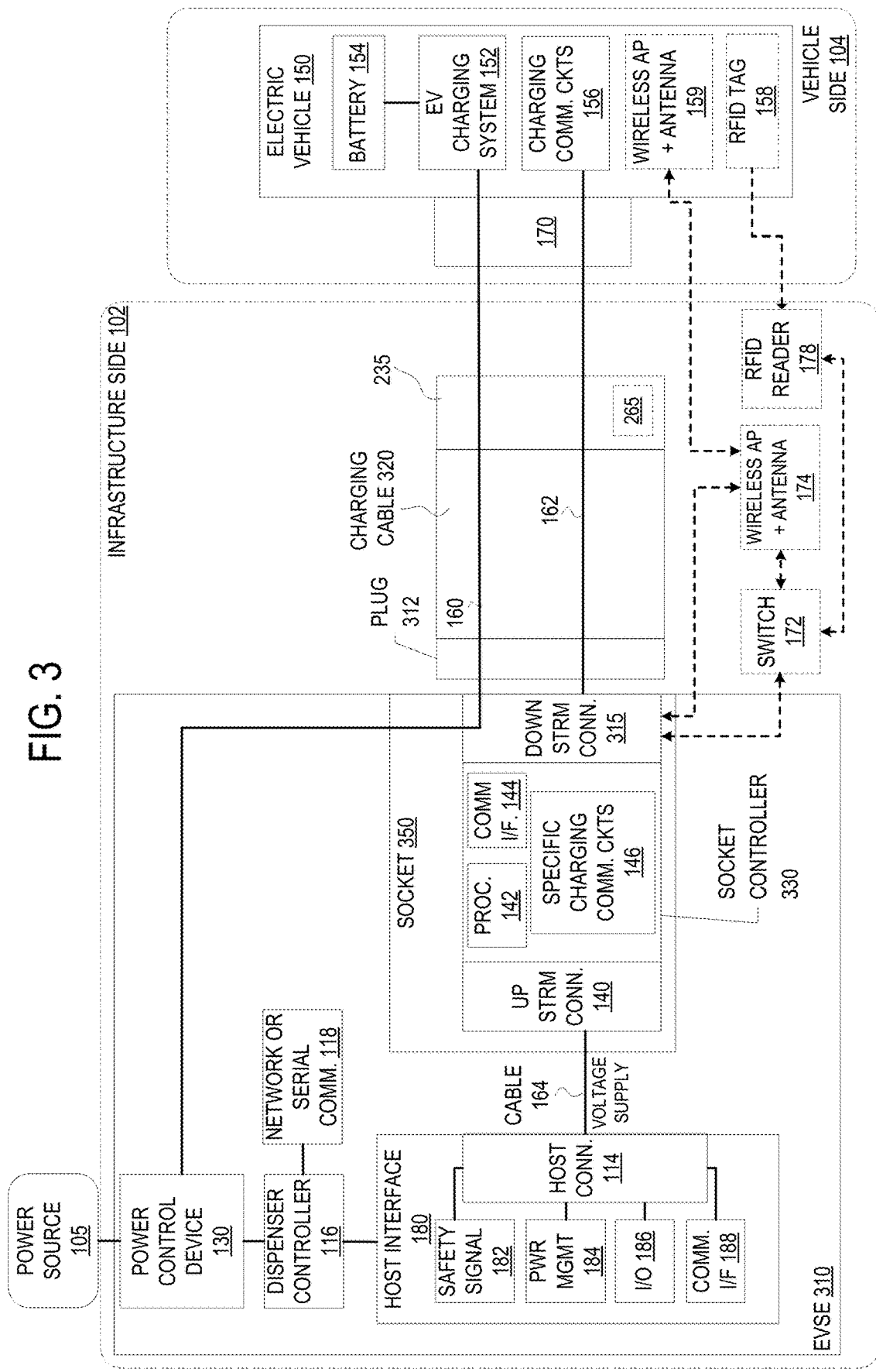
FIG. 3 illustrates an exemplary electric vehicle charging system that includes an EVSE that has a socket assembly that includes a charging protocol controller according to an embodiment.

Although FIG. 2 shows an embodiment where the charging protocol controller is included within the charging cable, the charging protocol controller may be located elsewhere. FIG. 3 shows an embodiment where the charging protocol controller is included in a socket assembly 350 of the EVSE 310. The socket assembly 350 may be field replaceable and/or reconfigurable. In such an embodiment, if a new and/or different charging configuration or combination is created, the socket assembly of the EVSE can be field upgraded (e.g., replaced) and/or reconfigured to support the new and/or different charging configuration instead of a costly replacement or infield reconfiguring of EVSE electronics.

Unlike the charging cable 215, the charging cable 320 includes a plug 312 that is adapted to interface with the socket assembly 350 (e.g., plug into a socket of the socket assembly 350). In use, an electric vehicle operator may plug the charging cable 320 into the EVSE 310 to connect the EV 150 to the EVSE 310. Also, unlike the charging cable 215, the charging cable 320 does not include the charging protocol controller 120.

The EVSE 310 is like the EVSE 110 except for the socket assembly 350. For instance, like FIG. 1, the EVSE 310 connects to the power source 105 and includes the dispenser controller 116, the power control device 130, the host interface 180, and optional network or serial communication modules 118. Like the EVSE 110, the EVSE 310 may include one or more additional components that are not shown in FIG. 3. For instance, the EVSE 310 may include a meter (e.g., a current measuring device) to measure current drawn by the electric vehicle 150. As another example, the EVSE 310 may include one or more components for cooling control (e.g., controlling a liquid cooled charging cable).

In FIG. 3, the charging protocol controller is referred to as the socket controller 330. Like the charging protocol controller 120, the socket controller 330 includes the upstream connector 140, the processor 142, the communication interface circuitry 144, and the specific charging communication circuits 146. The downstream socket connector 315 connects the socket controller 330 with the plug 312 of the charging cable 320 and the EV 150 when the charging cable connector 235 is engaged with the EV inlet 170. The downstream socket connector 315 terminates the power charging wire(s) 160 and the signal wire(s) 162. In an embodiment, the socket controller 330 does not include a power control device such as contactor(s) to control the on/off power for the power charging wire(s) 160. The downstream socket connector 315 may be different for different EV charging standards and charging communication protocols.

Although not shown in FIG. 3, like the charging protocol controller 120, the socket controller 330 may support peripheral features specific and local to the cable functions such as electrical contact temperature sensing and cable to electric vehicle connection detection (e.g., proximity detection). For example, the processor 142 may transmit EV proximity status (e.g., connected modes) to the host interface 180 of the EVSE 310 for processing. The socket controller 330 may include one or more sensors and/or receive sensor data from one or more sensors included within the charging cable 320. The one or more sensors can include including temperature sensor(s), voltage sensor(s), current sensor(s), pressure sensor(s), fluid leak detection sensor(s), handle moisture sensor(s), cut or abrasion detection sensor(s), proximity sensor(s), touch sensor(s), and/or light sensor(s). Like as described with respect to FIG. 1, the sensor data may be sent to the host interface 180 of the EVSE 310 for processing. For instance, the sensor data may indicate an unsafe condition or other error and the EVSE 310 may take one or more remedial actions. The remedial action(s) may include causing charging to be stopped completely or causing the current draw to be reduced and/or transmitting a notification message to the vehicle operator and/or the station operator alerting of the error or unsafe condition. In an embodiment, in addition to or in lieu of transmitting the sensor data to the host interface 180, the socket controller 330 may take one or more remedial actions if the sensor data indicates an unsafe condition or error condition without waiting for instructions from the EVSE host interface 180.

The temperature data may include measured temperature of the contacts and/or measured temperature of the socket controller 330. The voltage data may include measured voltage within the socket controller 330 and/or the charging cable 320. The current data may include measured current through the socket controller 330 and/or at certain contacts of the socket controller 330. The pressure data may include measured pressure of the liquid within the charging cable 320 and/or external pressure applied to the charging cable 320. The fluid leak detection data may indicate whether there is a leak of the fluid of the charging cable 320. The handle moisture data may indicate if the moisture level of the charging cable connector 235 exceeds a threshold. The cut or abrasion detection data may indicate whether there is external damage to the charging cable 320 that may impact safety or efficacy.

Like the charging protocol controller 120, the socket controller 330 stores configuration information that may indicate the communication protocol supported by the socket controller 330, the cable and/or connector type of the charging cable that is supported by the socket assembly 350, and/or identify certain features supported by the charging cable supported by the socket assembly 350 (e.g., the number and type of sensor(s) available, the maximum current supported by the charging cable, threshold parameters for cable connection detection to an electric vehicle, socket assembly factory dates, socket assembly service life, environmental limitations, specific materials, customer specific branding, stored socket assembly telemetry data and parameters to increase the accuracy in charging meteorology, etc.). This information can be different between different EV communication protocols, AC or DC charging, differing power level capabilities, etc. This information is transmitted to the host interface 180 of the EVSE 310 (e.g., upon power up of the EVSE 310) and the EVSE 310 configures its system to support that protocol, etc. For instance, the dispenser controller 116 may receive the configuration information and configure the system for supporting the identified charging communication protocol. By way of example, if the configuration information specifies that the socket controller 330 supports the J1772 standard, the system may be configured to expect data for corresponding with the operations of J1772 such as managing the states of EV charging (e.g., States A-F).

Since the socket assembly 350 includes the socket controller 330 that includes the specific charging communication circuits 146, those circuits are not required to be otherwise included in the EVSE 310 such as a board of the EVSE 310. The host interface 180 establishes the common communication and power control for the socket controller 330. The socket controller 330 provides both upstream and downstream communication across the cable 164 including upstream communication with the dispenser controller 116 and downstream communication to the charging cable connector 235 or with the EV inlet 170 as required per the EV protocol.

Thus, like the charging protocol controller 120, the socket controller 330 communicates with the electric vehicle with the specific protocol supported by the electric vehicle and charging cable and communicates with the host interface 180 of the EVSE 110. In an embodiment, the socket controller 330 passes through the signaling messages to the host interface 180 which then interprets the messages and returns messages back to the socket controller 330 for further action.

Figure 4:
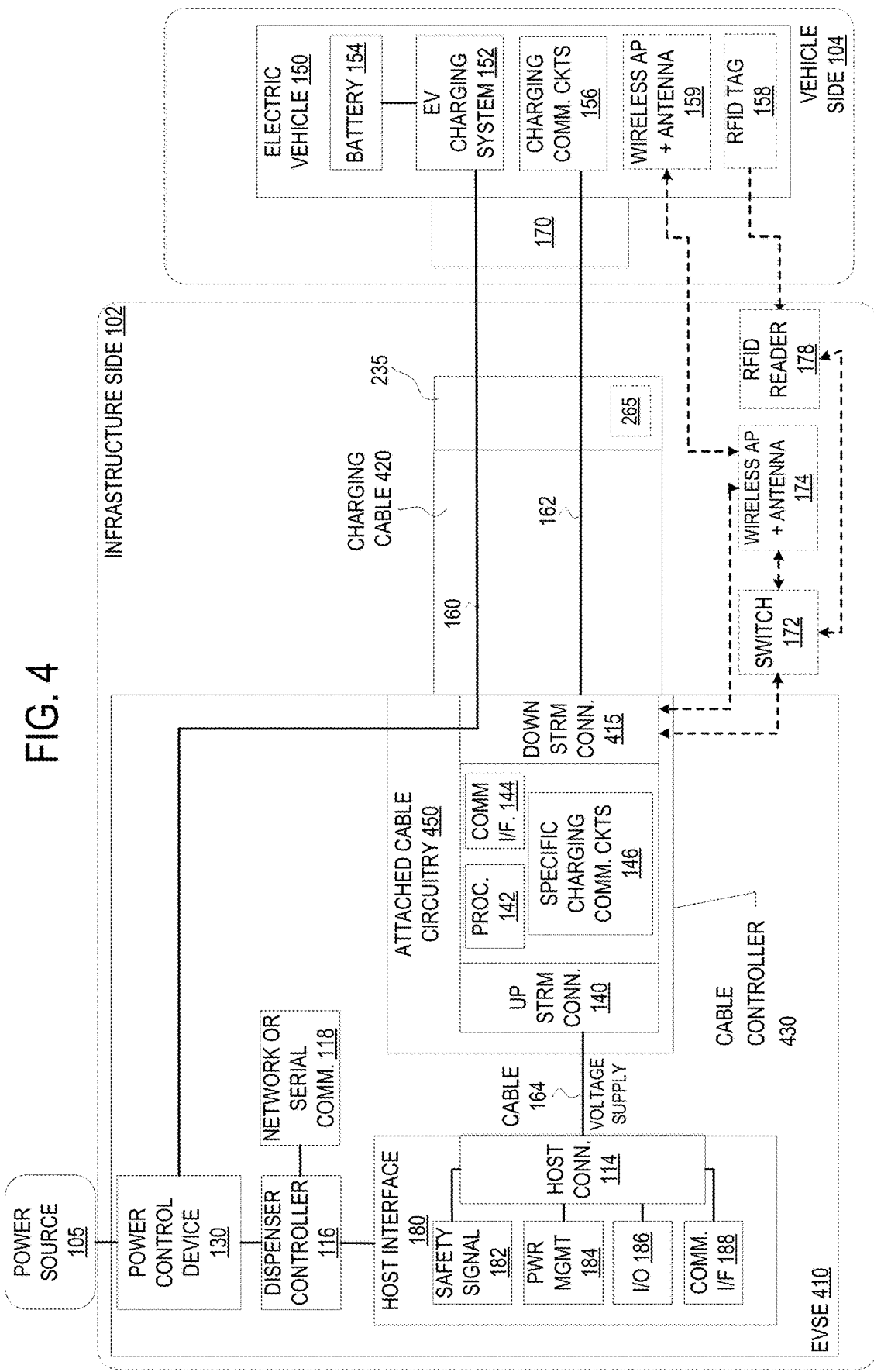
FIG. 4 illustrates an exemplary electric vehicle charging system that includes an EVSE where the charging protocol controller is included in an attached cable circuitry assembly of the EVSE according to an embodiment.

FIG. 4 shows an embodiment where the charging protocol controller is included in an attached cable circuitry assembly 450 of the EVSE 410. The attached cable circuitry assembly 450 may be field replaceable and/or reconfigurable. In such an embodiment, if a new and/or different charging configuration or combination is created, the attached cable circuitry assembly 450 of the EVSE can be field upgraded (e.g., replaced) and/or reconfigured to support the new and/or different charging configuration instead of a costly replacement or infield reconfiguring of EVSE electronics. Thus, when compared with FIG. 2, the attached cable circuitry assembly 450 is included within the housing of the EVSE 410.

The EVSE 410 is like the EVSE 110 except that the charging protocol controller is included within the attached cable circuitry assembly 450. For instance, like FIG. 1, the EVSE 410 connects to the power source 105 and includes the dispenser controller 116, the power control device 130, the host interface 180, and optional network or serial communication modules 118. Like the EVSE 110, the EVSE 410 may include one or more additional components that are not shown in FIG. 4. For instance, the EVSE 410 may include a meter (e.g., a current measuring device) to measure current drawn by the electric vehicle 150. As another example, the EVSE 410 may include one or more components for cooling control (e.g., controlling a liquid cooled charging cable).

In FIG. 4, the charging protocol controller is referred to as the cable controller 430. Like the charging protocol controller 120, the cable controller 430 includes the upstream connector 140, the processor 142, the communication interface circuitry 144, and the specific charging communication circuits 146. The downstream connector 415 connects the cable controller 430 with the charging EV 150 when the charging cable connector 235 is engaged with the EV inlet 170. The downstream connector 415 terminates the signal wire(s) 162 and optionally the power charging wire(s) 160. If the power charging wire(s) 160 are not terminated at the downstream connector 415, they are terminated by wire connector(s) like the wire connector(s) 132 that are connected to the contactors of the power control device 130. In an embodiment, the cable controller 430 does not include a power control device such as contactor(s) to control the on/off power for the power charging wire(s) 160. The downstream connector 415 may be different for different EV charging standards and charging communication protocols.

Although not shown in FIG. 4, like the charging protocol controller 120, the cable controller 430 may support peripheral features specific and local to the cable functions such as electrical contact temperature sensing and cable to electric vehicle connection detection (e.g., proximity detection). For example, the processor 142 may transmit EV proximity status (e.g., connected modes) to the host interface 180 of the EVSE 410 for processing.

The cable controller 430 may include one or more sensors and/or receive sensor data from one or more sensors included within the charging cable 420. The one or more sensors can include including temperature sensor(s), voltage sensor(s), current sensor(s), pressure sensor(s), fluid leak detection sensor(s), handle moisture sensor(s), cut or abrasion detection sensor(s), proximity sensor(s), touch sensor(s), and/or light sensor(s). Like as described with respect to FIG. 1, the sensor data may be sent to the host interface 180 of the EVSE 410 for processing. For instance, the sensor data may indicate an unsafe condition or other error and the EVSE 410 may take one or more remedial actions. The remedial action(s) may include causing charging to be stopped completely or causing the current draw to be reduced and/or transmitting a notification message to the vehicle operator and/or the station operator alerting of the error or unsafe condition. In an embodiment, in addition to or in lieu of transmitting the sensor data to the host interface 180, the cable controller 430 may take one or more remedial actions if the sensor data indicates an unsafe condition or error condition without waiting for instructions from the EVSE host interface 180.

The temperature data may include measured temperature of the contacts and/or measured temperature of the cable controller 430. The voltage data may include measured voltage within the cable controller 430 and/or the charging cable 420. The current data may include measured current through the cable controller 430 and/or at certain contacts of the cable controller 430. The pressure data may include measured pressure of the liquid within the charging cable 320 and/or external pressure applied to the charging cable 420. The fluid leak detection data may indicate whether there is a leak of the fluid of the charging cable 420. The handle moisture data may indicate if the moisture level of the charging cable connector 235 exceeds a threshold. The cut or abrasion detection data may indicate whether there is external damage to the charging cable 420 that may impact safety or efficacy.

Like the charging protocol controller 120, the cable controller 430 stores configuration information that may indicate the communication protocol supported by the cable controller 430, the cable and/or connector type of the charging cable 420, and/or identify certain features supported by the charging cable 420 (e.g., the number and type of sensor(s) available, maximum current it supports, threshold parameters for cable connection detection to an electric vehicle, cable factory dates, cable service life, environmental limitations, specific materials, customer specific branding, stored cable telemetry data and parameters to increase the accuracy in charging meteorology, etc.). This information can be different between different EV communication protocols, AC or DC charging, differing power level capabilities, etc. This information is transmitted to the host interface 180 of the EVSE 410 (e.g., upon power up of the EVSE 410) and the EVSE 410 configures its system to support that protocol, etc. For instance, the dispenser controller 116 may receive the configuration information and configure the system for supporting the identified charging communication protocol. By way of example, if the configuration information specifies that the cable controller 430 supports the J1772 standard, the system may be configured to expect data for corresponding with the operations of J1772 such as managing the states of EV charging (e.g., States A-F).

Since the attached cable circuitry assembly 450 includes the cable controller 430 that includes the specific charging communication circuits 146, those circuits are not required to be otherwise included in the EVSE 410 such as a board of the EVSE 410. The host interface 180 establishes the common communication and power control for the cable controller 430. The cable controller 430 provides both upstream and downstream communication across the cable 164 including upstream communication with the dispenser controller 116 and downstream communication to the charging cable connector 235 or with the EV inlet 170 as required per the EV protocol.

Thus, like the charging protocol controller 120, the cable controller 430 communicates with the electric vehicle with the specific protocol supported by the electric vehicle and charging cable and communicates with the host interface 180 of the EVSE 110. In an embodiment, the cable controller 430 passes through the signaling messages to the host interface 180 which then interprets the messages and returns messages back to the cable controller 430 for further action.

Figure 5:
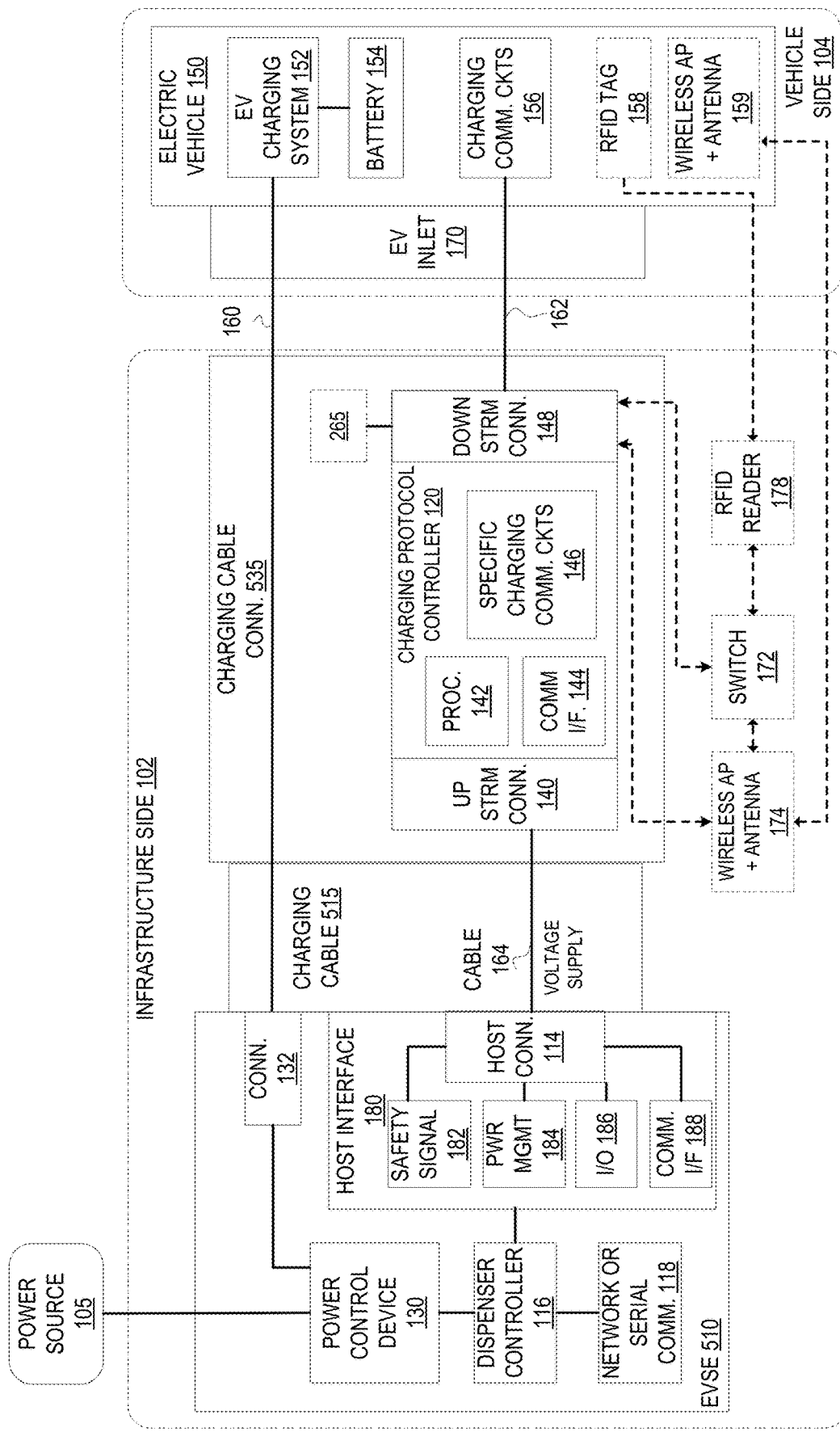
FIG. 5 illustrates an exemplary electric vehicle charging system where a charging protocol controller is included in a charging cable connector according to an embodiment.

FIG. 5 shows an embodiment where the charging protocol controller is included in a charging cable connector. The charging cable connector assembly and/or the charging cable is field replaceable and/or reconfigurable. If a new and/or different charging configuration or combination is created, the charging cable connector assembly and/or the charging cable can be field upgraded (e.g., replaced) and/or reconfigured to support the new and/or different charging configuration instead of a costly replacement or infield reconfiguring of EVSE electronics. As compared to FIG. 2 where the charging protocol controller is included in the body of the charging cable, the charging protocol controller is included in the charging cable connector 535 itself in FIG. 5. Thus, the charging protocol controller 120 is included in the body of the charging cable connector 535. The charging protocol controller 120 illustrated in FIG. 5 operates the same as the charging protocol controller 120 illustrated in FIG. 1.

Although FIG. 5 shows an embodiment where the charging cable 515 is attached to the EVSE 510, the charging cable 515 may instead have a plug that is adapted to interface with a socket assembly of the EVSE 110.

Figure 6:
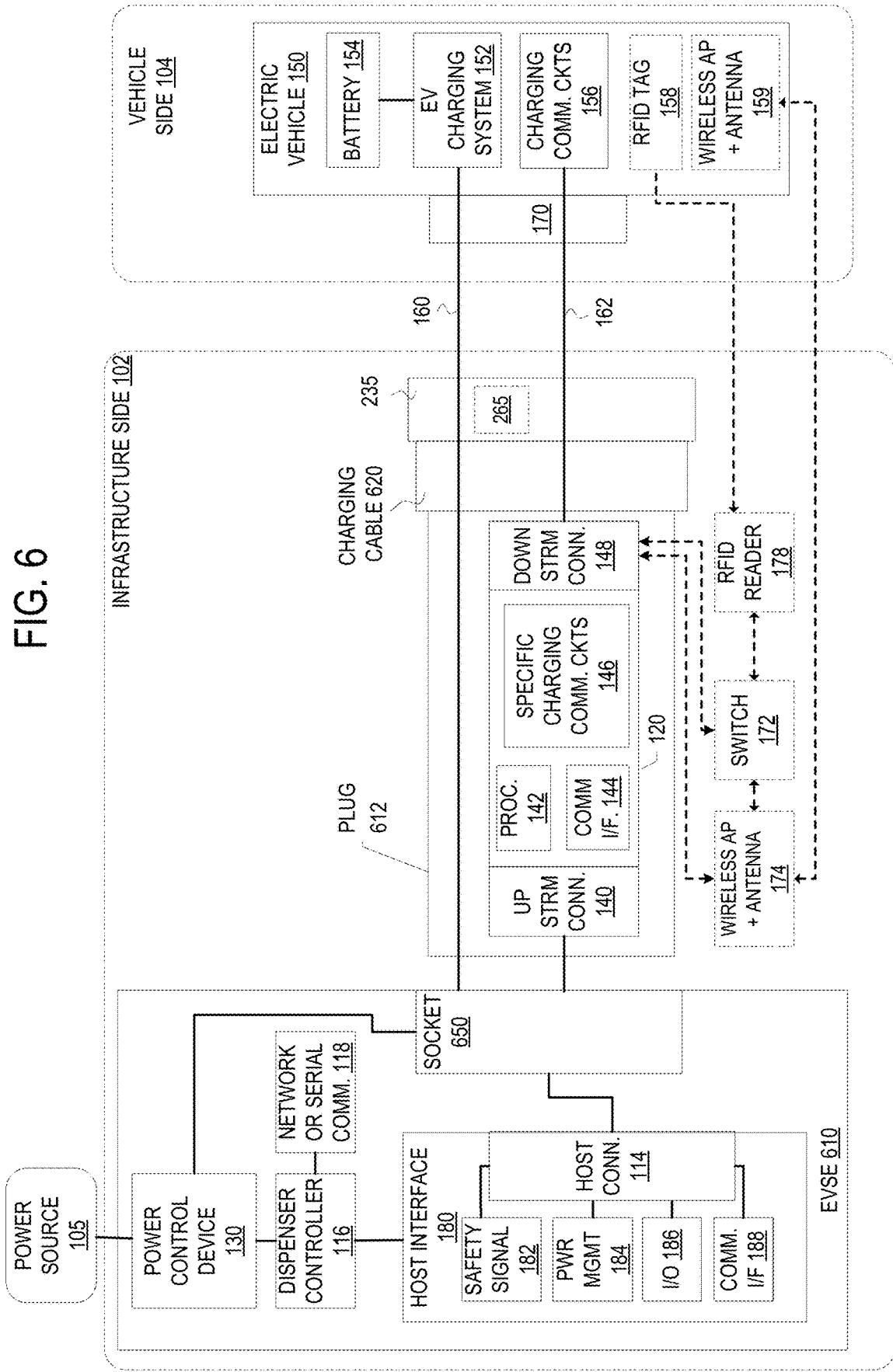
FIG. 6 shows an embodiment where the charging protocol controller is included in a plug of a charging cable according to an embodiment.

FIG. 6 shows an embodiment where the charging protocol controller is included in a plug of a charging cable according to an embodiment. As compared to FIG. 2 where the charging protocol controller is included in the body of the charging cable, in FIG. 6 the charging protocol controller is included in the plug of the charging protocol controller. Thus, the charging protocol controller 120 is included in the plug 612 of the charging cable 620 that is adapted to interface with the socket 650 of the EVSE 610. The charging protocol controller 120 illustrated in FIG. 6 operates the same as the charging protocol controller 120 illustrated in FIG. 2 with the exception that the upstream connector 140 is coupled with one or more pins of the plug 612 that are inserted into the socket 650. The socket 650 may be different for different EV charging standards and charging communication protocols. Embodiments have shown the charging protocol controller being included in various locations of the charging system. In some embodiments, portions of the charging protocol controller are distributed in different locations of the charging system.

Figure 7:
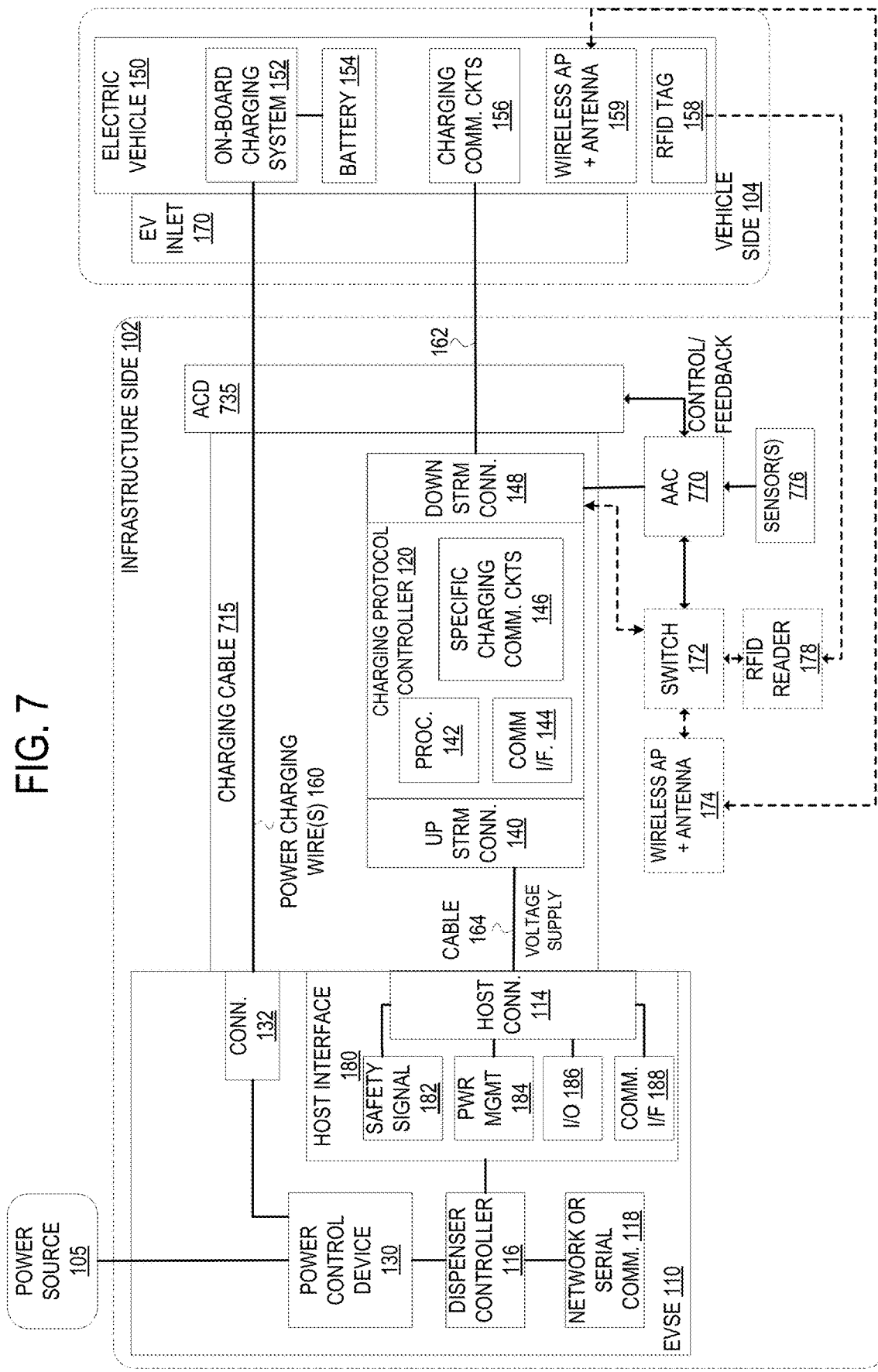
FIG. 7 illustrates an exemplary electric vehicle charging system that includes an electric vehicle service equipment (EVSE) with a charging cable that includes a charging protocol controller that is connected to an automatic connection device (ACD) according to an embodiment.

In some embodiments, the electric vehicle charging system may be implemented in charging systems that use an automatic connection device. FIG. 7 illustrates an exemplary electric vehicle charging system that includes an electric vehicle service equipment (EVSE) 110 with a charging cable that includes a charging protocol controller that is connected to an automatic connection device (ACD) according to an embodiment. The EV charging system included in FIG. 7 uses an automatic connection device (ACD) to automatically connect the electric vehicle with the EVSE.

The charging cable 715 includes the charging protocol controller 120. Unlike as shown in FIG. 1, an automatic connection device (ACD) 735 is used as the charging cable connector. Thus, the ACD 735 connects the charging cable 715 to the EV 150. The ACD 735 is an active device where the connection between the EVSE 110 and the EV 150 is made without user interaction and may provide an electromechanical interface. The ACD 735 may be a pantograph (e.g., used during opportunity charging or depot charging) or other socket/pin connector suitable to make an automatic connection with an electric vehicle. The ACD 735 may make a physical connection (e.g., physically connect the charging cable to the EV) or a wireless power transfer connection. Although FIG. 7 shows the EV 150 including the EV inlet 170, in some cases the EV does not include an inlet but makes a connection to the ACD in other ways (e.g., wireless, power rails). In cases where the EV 150 includes an inlet like the EV inlet 170, the EV inlet 170 may be configured to receive the automatic connection of the ACD 735.

The system of FIG. 7 also includes the automatic actuation controller (AAC) 770 that controls the ACD 735 based on input from the charging protocol controller 120 and possibly one or more sensors (776) (e.g., cameras, light devices, etc.). The AAC 770 interfaces with the ACD 735 for control and feedback. FIG. 7 also illustrates the optional switch 172 (e.g., an Ethernet switch) that can be coupled to the charging protocol controller 120, a wireless access point and antenna 174, the AAC 770, and the RFID reader 178. The electric vehicle 150 may include the wireless access point and antenna 159 that is used for communicating wirelessly with the wireless access point and antenna 174 of the charging infrastructure. The electric vehicle 150 may include the RFID tag 158 that can be read by the RFID reader 178 of the charging infrastructure to assist with pairing wireless access points in areas with many wireless access points such as a vehicle depot. RFID can also assist with alignment functionality of the ACD 735.

Thus, in the example of FIG. 7, the charging protocol controller 120 acts as a communications bridge between the EVSE 110 and the ACD 735, AAC 770, and/or the EV 150. In an embodiment, the charging protocol controller 120 passes through the signaling messages to the host interface 180 which then interprets the messages and returns messages back to the charging protocol controller 120 for further action.

In some embodiments, the control and feedback from the AAC 770 is not communicated with the EVSE 110. For instance, in such embodiments the physical control of the ACD 735 is performed in coordination with the AAC 770. That is, the positioning of the ACD 735 and/or the movement of the ACD 735 may not be communicated to the EVSE 110 except for the ACD 735 being connected to the EV inlet 170.

Figure 8:
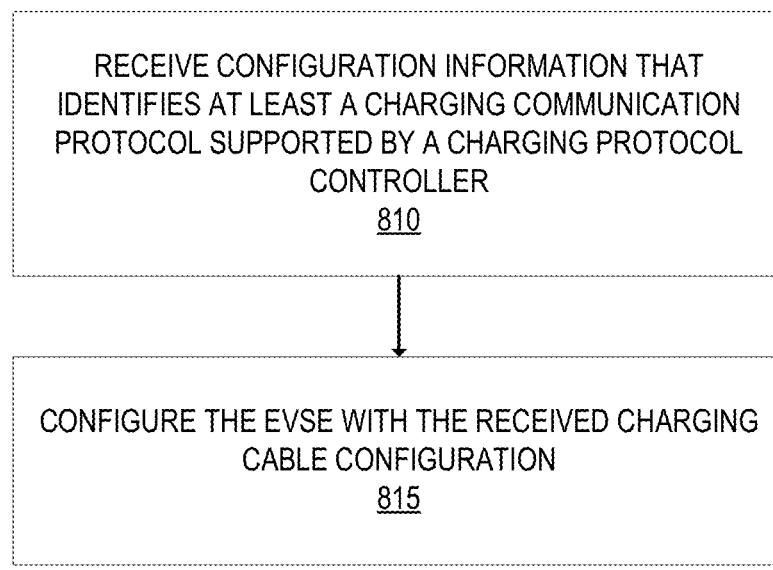
FIG. 8 is a flow diagram that illustrates exemplary operations performed at an EVSE configuring charging communication protocol support according to an embodiment.

FIG. 8 is a flow diagram that illustrates exemplary operations performed at an EVSE for configuring charging communication protocol support according to an embodiment. The operations of FIG. 8 and other flow diagrams will be described with respect to the exemplary embodiment of FIG. 1. However, the operations of FIG. 8 and other flow diagrams can be performed by embodiments other than those of the exemplary embodiment of FIG. 1, and the exemplary embodiment of FIG. 1 can perform operations different than that of FIG. 8 and the other flow diagrams.

At operation 810, a host interface of an EVSE receives configuration information that identifies at least a charging communication protocol supported by a charging protocol controller. For instance, with respect to FIG. 1, the host interface 180 may receive configuration information from the charging protocol controller 120 that identifies the charging communication supported by the charging protocol controller 120. The received configuration information may include an identifier that identifies the supported EV protocol. The configuration information may also indicate the type of charging cable (e.g., whether it is a charging cable supporting DC charging or if it is a charging cable supporting AC charging) and/or identify certain features supported by the charging cable (e.g., sensor(s) available, maximum current supported by the charging cable, etc.). In an embodiment, the host interface of the EVSE receives the configuration information from the charging protocol controller as part of an initialization procedure of the EVSE (e.g., upon powering up). With respect to FIG. 1, the configuration information may be received over the cable 164 that connects the host connector 114 of the EVSE 110 and the upstream connector 140 of the charging protocol controller 120.

Next, at operation 815, the EVSE configures itself according to the received configuration. By way of example, the dispenser controller 116 receives the charging cable configuration information and configures the EVSE 110 for supporting the identified charging communication protocol.

Figure 9:
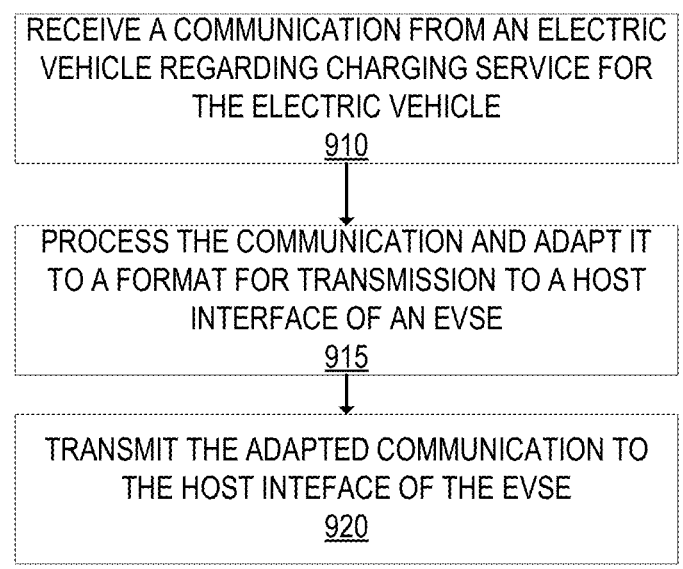
FIG. 9 is a flow diagram that illustrates exemplary operations performed at a charging protocol controller that handles charger to EV communication according to an embodiment.

FIG. 9 is a flow diagram that illustrates exemplary operations performed at a charging protocol controller that handles charger to EV communication according to an embodiment. At operation 910, the charging protocol controller receives a communication from an EV regarding charging service for the EV such as related to charging states or request for power delivery. The communication may be detected from the EV such as detecting a change in voltage peaks of a pilot signal to determine a charging state communicated by the EV. For example, with respect to FIG. 1, the specific charging communication circuits 146 of the charging protocol controller 120 may monitor the change in voltage peaks of a pilot signal for determining charging states and faults for charging the EV 150. The communication may be received over a wired connection (e.g., over a signal wire) and/or through a wireless communication module (e.g., radio) communicating wirelessly with the EV.

Next, at operation 915, the charging protocol controller processes the communication and adapts it to a format for transmission to the host interface of the EVSE. For instance, the charging protocol controller translates the communication received from the electric vehicle using its specific charging protocol into a format that can be transmitted over the common upstream interface (e.g., the upstream connector 140 to the host connector 114). Next, at operation 920, the charging protocol controller transmits the adapted communication to the host interface of the EVSE. For instance, the adapted format may be a digital communication sent over the cable 164, for example.

Figure 10:
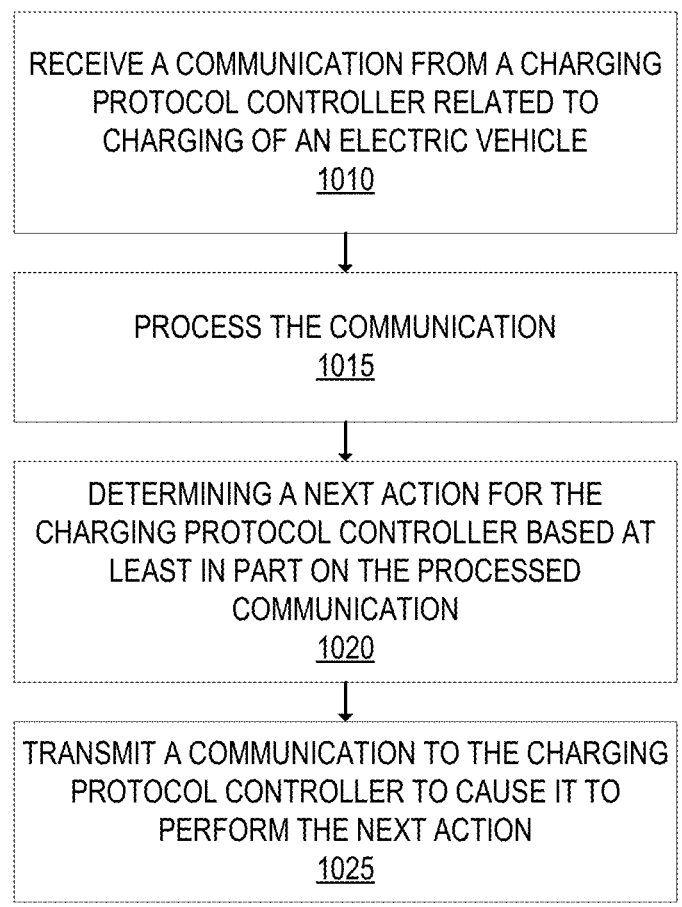
FIG. 10 is a flow diagram that illustrates exemplary operations performed at a host interface of an EVSE interacting with a charging protocol controller that handles charger to EV communication according to an embodiment.

FIG. 10 is a flow diagram that illustrates exemplary operations performed at a host interface of an EVSE interacting with a charging protocol controller that handles charger to EV communication according to an embodiment. At operation 1010, the host interface receives a communication from a charging protocol controller related to charging an electric vehicle such as relating to charging states or a request for power delivery. The communication may be received over a common interface. By way of example, with respect to FIG. 1, the host interface 180 may receive, from the charging protocol controller 120, a communication (e.g., over the cable 164) that relates to charging states or a request for power delivery for the EV 150. If, for instance, J1772 is being used, the communication may indicate a change in voltage peak of a pilot signal to determine charging states and/or faults and/or a change in charging states and/or faults.

Next, at operation 1015, the host interface processes the received communication. The processing depends on the type and content of the communication. For example, if J1772 is being used and if the communication represents a state change from state A to state B, the processing may include determining the available continuous current capacity for the electric vehicle. Next, at operation 1020, the host interface determines a next action for the charging protocol controller based at least in part on the processed communication. Using the same example as above, the host interface may determine that it will send a message to the charging protocol controller that instructs the charging protocol controller to signal a specific available continuous current capacity to the electric vehicle. Next, at operation 1025, the host interface transmits the communication to the charging protocol controller to cause it to perform the next action. The communication may be transmitted over the cable 164 between the host connector 114 and the upstream connector 140 with reference to FIG. 1.

Figure 11:
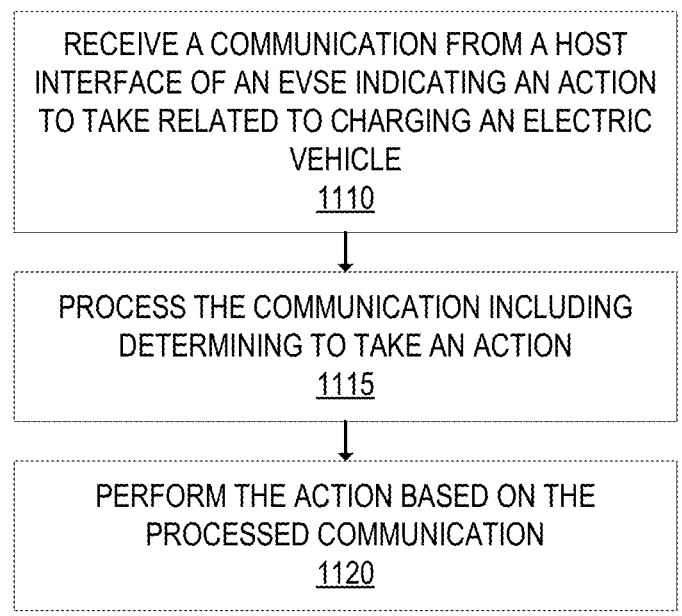
FIG. 11 illustrates exemplary operations performed at a charging protocol controller that handles charger to EV communication according to an embodiment.

FIG. 11 illustrates exemplary operations performed at a charging protocol controller that handles charger to EV communication according to an embodiment. At operation 1110, the charging protocol controller receives a communication from a host interface of an EVSE indicating an action to take related to charging an electric vehicle. For instance, with respect to FIG. 1, the charging protocol controller 120 receives a communication from the host interface 180 over the cable 164. Next, at operation 1115, the charging protocol controller processes the communication including determining to take an action. For instance, with respect to FIG. 1, the processor 142 processes the received communication and causes the specific charging communication circuits 146 to take an action in response to the communication. Next, at operation 1120, the charging protocol controller performs the action based on the processed communication. For instance, if the received message indicates the available continuous current capacity for the EV 150, the processor 142 causes the specific charging communication circuits 146 to modulate the pilot duty cycle according to the received message to signal the available continuous current capacity to the EV 150.

The techniques shown in the figures can be implemented using code and data stored and executed on one or more electronic devices (e.g., an EVSE). Such electronic devices store and communicate (internally and/or with other electronic devices over a network) code and data using machine-readable media, such as non-transitory machine-readable storage media (e.g., magnetic disks; optical disks; random access memory; read only memory; flash memory devices; phase-change memory) and transitory machine-readable communication media (e.g., electrical, optical, acoustical or other form of propagated signals-such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

In the preceding description, numerous specific details are set forth to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. An attached cable circuitry assembly of an electric vehicle supply equipment (EVSE), comprising:
    a charging protocol controller that includes:
        a first connector to connect the charging protocol controller via one or more signal wires to an electric vehicle to terminate the one or more signal wires of a charging cable that carry signaling data relating to charging the electric vehicle;
        a second connector to connect the charging protocol controller via a cable to a third connector of the EVSE, the second connector to terminate supply voltage supporting electronics on the charging protocol controller and terminate communication from the EVSE received over the cable that connects the second connector to the third connector;
        one or more charging communication circuits; and
        a processor to perform:
            signal handshake and control, and
            communication between the EVSE and the charging protocol controller.

2. The attached cable circuitry assembly of claim 1, wherein the one or more charging communication circuits are specific to an electric vehicle charging protocol supported by the charging protocol controller.

3. The attached cable circuitry assembly of claim 1, wherein the one or more charging communication circuits includes a circuit to source a control pilot signal.

4. The attached cable circuitry assembly of claim 1, wherein the one or more charging communication circuits includes a circuit to monitor detection of presence of a charging cable connector of the charging cable in an inlet of an electric vehicle.

5. The attached cable circuitry assembly of claim 1, wherein the one or more charging communication circuits includes a power line communication circuit.

6. The attached cable circuitry assembly of claim 1, further comprising:
    wherein the charging protocol controller further includes a non-volatile memory to store an identifier that indicates an electric vehicle protocol supported by the charging protocol controller; and
    the processor further to transmit the identifier to a controller of the EVSE to configure the EVSE to support the electric vehicle protocol supported by the charging protocol controller.

7. The attached cable circuitry assembly of claim 1, wherein the second connector is further to terminate one or more logical signals from the EVSE.

8. The attached cable circuitry assembly of claim 1, wherein the charging protocol controller further includes one or more sensors, wherein the processor is further to read and process sensor data of the one or more sensors, and wherein the one or more sensors include a temperature sensor, a voltage sensor, a current sensor, and/or a pressure sensor.

9. An electric vehicle supply equipment (EVSE), comprising:
    a set of one or more contactors on one or more power lines;
    a controller to manage the set of one or more contactors including causing the set of one or more contactors to open and close;
    a first connector to connect via a cable to a second connector of a charging protocol controller included in an attached cable circuitry assembly of the EVSE;
    a circuit to provide supply voltage to the charging protocol controller of the attached cable circuitry assembly through the cable that connects the first connector to the second connector;
    a communication interface circuit to support communication between the EVSE and the charging protocol controller of the attached cable circuitry assembly through the cable that connects the first connector to the second connector;
    a charging cable that includes:
        one or more power charging wires that are electrically coupled with the set of one or more contactors to carry power between the EVSE and an electric vehicle,
        one or more signal wires to carry signaling data relating to charging the electric vehicle, and
        a charging cable connector to connect the one or more power charging wires and the one or more signal wires to an inlet of the electric vehicle; and
    the attached cable circuitry assembly that includes the charging protocol controller, the charging protocol controller includes:
        a third connector to connect the charging protocol controller via the one or more signal wires to the electric vehicle to terminate the one or more signal wires that carry the signaling data relating to the charging of the electric vehicle,
        the second connector to terminate supply voltage supporting electronics on the charging protocol controller and terminate communication from the EVSE received over the cable that connects the first connector to the second connector,
one or more charging communication circuits, and
a processor to perform:
  signal handshake and control, and
  communication between the EVSE and the charging protocol controller.

10. The EVSE of claim 9, wherein the one or more charging communication circuits are specific to an electric vehicle charging protocol supported by the charging protocol controller.

11. The EVSE of claim 9, wherein the one or more charging communication circuits includes a circuit to source a control pilot signal.

12. The EVSE of claim 9, wherein the one or more charging communication circuits includes a circuit to monitor detection of presence of the charging cable connector in the inlet of the electric vehicle.

13. The EVSE of claim 9, wherein the one or more charging communication circuits includes a power line communication circuit.

14. The EVSE of claim 9, further comprising:
wherein the charging protocol controller further includes a non-volatile memory to store an identifier that indicates an electric vehicle protocol supported by the charging protocol controller; and
wherein the controller is to receive the identifier from the processor of the charging protocol controller and configure the EVSE to support the electric vehicle protocol supported by the charging protocol controller.

15. The EVSE of claim 9, wherein the second connector is further to terminate one or more logical signals from the EVSE.

16. The EVSE of claim 9, wherein the charging protocol controller further includes one or more sensors, wherein the processor is further to read and process sensor data of the one or more sensors, and wherein the one or more sensors include a temperature sensor, a voltage sensor, a current sensor, and/or a pressure sensor.

* * * * *